United States Patent
Radulescu et al.

(10) Patent No.: US 10,142,980 B2
(45) Date of Patent: Nov. 27, 2018

(54) DISCOVERY REFERENCE SIGNAL TRANSMISSION WINDOW DETECTION AND DISCOVERY REFERENCE SIGNAL MEASUREMENT CONFIGURATION

(71) Applicant: QUALCOMM Incorporated, San Diego, CA (US)

(72) Inventors: Andrei Radulescu, San Diego, CA (US); Chirag Patel, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 15/441,215

(22) Filed: Feb. 23, 2017

(65) Prior Publication Data
US 2017/0251499 A1 Aug. 31, 2017

Related U.S. Application Data

(60) Provisional application No. 62/300,718, filed on Feb. 26, 2016, provisional application No. 62/318,742, filed on Apr. 5, 2016.

(51) Int. Cl.
*H04L 12/24* (2006.01)
*H04W 72/04* (2009.01)
(Continued)

(52) U.S. Cl.
CPC ........ *H04W 72/042* (2013.01); *H04B 17/318* (2015.01); *H04J 11/0036* (2013.01);
(Continued)

(58) Field of Classification Search
None
See application file for complete search history.

(56) References Cited

U.S. PATENT DOCUMENTS

| 8,442,069 B2 * | 5/2013 | Ji | H04W 72/082 370/468 |
| 2013/0028239 A1 * | 1/2013 | Dinan | H04W 72/042 370/336 |

(Continued)

FOREIGN PATENT DOCUMENTS

| WO | WO 2015122737 A1 * | 8/2015 | .......... H04L 5/0053 |
| WO | WO-2015122737 A1 | 8/2015 | |

(Continued)

OTHER PUBLICATIONS

Intel Corporation, "DRS Measurement for Small Cell On/Off and Discovery," 3GPP TSG RAN WG2 Meeting #87, R2-143822, Dresden, Germany, Aug. 18-22, 2014, 5 pgs., XP0508201, 3rd Generation Partnership Project.

(Continued)

*Primary Examiner* — Afsar M Qureshi
(74) *Attorney, Agent, or Firm* — Holland & Hart LLP

(57) ABSTRACT

Methods, systems, and devices for wireless communication are described. A user equipment (UE) may monitor a neighbor cell and report the result to a serving base station. Based on the report, the serving base station may identify an estimated discovery reference signal (DRS) transmission window of the neighbor cell. In some cases, the UE may estimate and report parameters of the neighbor DRS transmission window, and in other cases, the UE may make a measurement report and the base station may infer DRS transmission window parameters. The base station may then provide the UE with a DRS measurement timing configuration (DMTC) based on the estimated parameters of the neighbor cell so that the UE may monitor the neighbor cell (Continued)

and the serving cell in an efficient manner. For example, the UE may conserve battery life by refraining from monitoring DRS during periods when a DRS transmission is not likely.

26 Claims, 20 Drawing Sheets

(51) Int. Cl.

| | | |
|---|---|---|
| *H04B 17/318* | (2015.01) | |
| *H04L 5/00* | (2006.01) | |
| *H04W 24/08* | (2009.01) | |
| *H04W 24/10* | (2009.01) | |
| *H04W 72/12* | (2009.01) | |
| *H04W 72/08* | (2009.01) | |
| *H04W 74/08* | (2009.01) | |
| *H04J 11/00* | (2006.01) | |
| *H04W 48/00* | (2009.01) | |
| *H04W 48/16* | (2009.01) | |
| *H04W 52/02* | (2009.01) | |
| *H04W 88/02* | (2009.01) | |
| *H04W 88/08* | (2009.01) | |

(52) U.S. Cl.
CPC ........ *H04L 5/0048* (2013.01); *H04L 41/0866* (2013.01); *H04W 24/08* (2013.01); *H04W 24/10* (2013.01); *H04W 48/00* (2013.01); *H04W 48/16* (2013.01); *H04W 52/0216* (2013.01); *H04W 72/0453* (2013.01); *H04W 72/085* (2013.01); *H04W 72/1289* (2013.01); *H04W 74/0833* (2013.01); *H04W 88/02* (2013.01); *H04W 88/08* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/24* (2018.01); *Y02D 70/25* (2018.01)

(56) References Cited

U.S. PATENT DOCUMENTS

| | | | |
|---|---|---|---|
| 2015/0092582 A1 | 4/2015 | Liao et al. | |
| 2015/0092768 A1* | 4/2015 | Ng | H04W 48/16 370/350 |
| 2015/0264592 A1* | 9/2015 | Novlan | H04L 27/2601 370/252 |
| 2016/0295500 A1 | 10/2016 | Liu et al. | |
| 2016/0338112 A1* | 11/2016 | Lee | H04W 76/27 |
| 2017/0070312 A1* | 3/2017 | Yi | H04J 11/0036 |
| 2017/0223558 A1 | 8/2017 | Deng et al. | |
| 2017/0251456 A1* | 8/2017 | Radulescu | H04B 17/318 |
| 2017/0303152 A1* | 10/2017 | Kim | H04W 24/08 |
| 2017/0359133 A1* | 12/2017 | Kim | H04B 17/318 |
| 2018/0062806 A1* | 3/2018 | Jung | H04L 5/0048 |

FOREIGN PATENT DOCUMENTS

| | | | | |
|---|---|---|---|---|
| WO | WO 2016020750 A2 * | 2/2016 | ............ | H04W 24/10 |
| WO | WO-2016020750 A2 | 2/2016 | | |
| WO | WO 2017026985 A1 * | 2/2017 | ............ | H04L 5/005 |

OTHER PUBLICATIONS

ISA/EP, International Search Report and Written Opinion of the International Searching Authority, Int'l Application No. PCT/US2017/019545, dated May 24, 2017, European Patent Office, Rijswijk, NL, 16 pgs.

Mediatek Inc., "DRS Impacts on RRM Measurement," 3GPP TSG-RAN2 Meeting #86, R2-142178, Seoul, South Korea, May 19-23, 2014, 6 pgs., XP050793386, 3rd Generation Partnership Project.

Nokia Networks et al., "On DRS Based RRM Measurement Procedures," 3GPP TSG-RAN WG1 Meeting #78, R1-143244, Dresden, Germany, Aug. 18-22, 2014, 3 pgs., XP050815635, 3rd Generation Partnership Project.

Nokia Siemens Networks (Rapporteur), "Stage 2 Description of Carrier Aggregation," 3GPP TSG-RAN WG2 Meeting #70, R2-103427, Montreal, Canada, May 10-14, 2010, 22 pgs., XP050423504, 3rd Generation Partnership Project.

NTT DOCOMO et al,. "WF on LAA DRS Design and Transmission Timing," 3GPP TSG RAN WG1 Meeting #82, R1-154817, Beijing, China, Aug. 24-28, 2015, 4 pages, XP051044998, 3rd Generation Partnership Project.

Panasonic, "Remaining Topic of Small Cell On/Off," 3GPP TSG RAN WG1 Meeting #79, R1-144788, San Francisco, USA, Nov. 17-21, 2014, 4 pgs., XP050895486, 3rd Generation Partnership Project.

Qualcomm Incorporated, "Discovery and RRM Procedure for LAA," 3GPP TSG RAN WG1 Meeting #82, R1-153870, Beijing, China, Aug. 24-28, 2015, 3 pgs., XP050993842, 3rd Generation Partnership Project.

Samsung, "Discussion on LAA DRS Design," 3GPP TSG RAN WG1 Meeting #81, R1-152866, Fukuoka, Japan, May 25-29, 2015, 8 pgs., XP050972415, 3rd Generation Partnership Project.

Samsung, "Remaining Details of DRS Design," 3GPP TSG RAN WG1 Meeting #82bis, R1-155465, Malmo, Sweden, Oct. 5-9, 2015, 4 pgs., XP051002370, 3rd Generation Partnership Project.

ZTE, "Details of DRS Design for LAA," 3GPP TSG RAN WG1 Meeting #82bis, R1-155533, Malmo, Sweden, Oct. 5-9, 2015, 10 pgs., XP051002414, 3rd Generation Partnership Project.

* cited by examiner

DISCOVERY REFERENCE SIGNAL TRANSMISSION WINDOW DETECTION AND DISCOVERY REFERENCE SIGNAL MEASUREMENT CONFIGURATION

CROSS REFERENCES

The present application for Patent claims priority to U.S. Provisional Patent Application No. 62/300,718 by Radulescu et al. entitled "Discovery Reference Signal Transmission Window Detection and Discovery Reference Signal Measurement Configuration," filed Feb. 26, 2016, and to U.S. Provisional Patent Application No. 62/318,742 by Radulescu et al. entitled "Discovery Reference Signal Transmission Window Detection and Discovery Reference Signal Measurement Configuration," filed Apr. 5, 2016, assigned to the assignee hereof.

BACKGROUND

The following relates generally to wireless communication and more specifically to discovery reference signal (DRS) transmission window detection and discovery signal measurement configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In some cases, a base station may transmit DRS to enable UEs to identify, evaluate, and connect to the base station. A UE may monitor for a DRS while camped on a cell or connected to a cell, and may also monitor DRS of neighboring cells. However, monitoring for the DRS may consume battery power. DRS monitoring may limit the useful battery time and degrade the user experience. A UE's DRS monitoring may also be timed so as not to identify a preferred cell for connection.

SUMMARY

A user equipment (UE) may monitor a neighbor cell and report the result to a serving base station. Based on the report, the serving base station may identify an estimated discovery reference signal (DRS) transmission window of the neighbor cell. In some cases, the UE may estimate and report parameters of the neighbor DRS transmission window, and in other cases, the UE may simply make a measurement report and the base station may infer DRS transmission window parameters. The base station may then provide the UE with a DRS measurement timing configuration (DMTC) based on the estimated parameters of the neighbor cell so that the UE may monitor the neighbor cell and the serving cell in an efficient manner. For example, the UE may conserve battery life by refraining from monitoring DRS during periods when a DRS transmission is not likely.

In some examples, a UE may determine that a DRS is not received during a DRS transmission window, which may be due to a failure of a cell to win contention for a channel, for example, in a shared radio frequency spectrum band. In such cases, the UE may signal that the DRS has been blocked rather than declaring a radio link failure (RLF) due to non-receipt of the DRS. In some examples, a UE may monitor a subset of resources of a DRS transmission window (e.g., a narrowband portion of a DRS bandwidth, or a channel or a subset of channels within the DRS transmission window other than a channel containing the DRS), and make a determination of DRS blocking based on the subset of resources. Such monitoring may allow lower complexity of detection in situations where the UE is not explicitly monitoring for DRS. In some examples, the UE may report radio link monitoring (RLM) parameters based on DRS detection failure rather than that the DRS has been blocked.

In some examples, a random access channel (RACH) procedure may be configured between a UE and a base station. In some examples, the base station may support both a two-step and a four-step RACH procedure. In some cases, the UE may be allowed to decide between the two-step and four-step RACH procedure autonomously or semi-autonomously, based on configuration. For example, the decision may be based on metrics such as channel quality, and the base station may advertise (e.g., via enhanced system information block (eSIB)) selection criteria, such as thresholds for one or more metrics, and the UE may select the RACH procedure based on the selection criteria. In some examples, the two-step RACH procedure may use short physical uplink control channel (sPUCCH) or enhanced PUCCH (ePUCCH) random access resources. In some examples, a first subset of random access resources may be provided for the two-step RACH procedure, and a second subset of random access resources may be provided for the four-step RACH procedure. In some examples, the first subset of resources may be a first subset of interlaces of a set of RACH resources, and the second subset of resources may be a second subset of interlaces of the set of RACH resources. In some examples, the first subset of interlaces may be configured to allow sufficient payload capacity for a first RACH message of the two-step RACH process. In some examples, the base station may identify a RACH procedure as a two-step RACH procedure based on receiving a RACH message on the first subset of interlaces.

A method of wireless communication is described. The method may include determining one or more parameters associated with a DRS transmission window of a neighbor cell and transmitting a message that includes a DMTC to a UE, wherein the DMTC is based at least in part on the one or more parameters associated with the DRS transmission window of the neighbor cell.

An apparatus for wireless communication is described. The apparatus may include means for determining one or more parameters associated with a DRS transmission window of a neighbor cell and means for transmitting a message that includes a DMTC to a UE, wherein the DMTC is based at least in part on the one or more parameters associated with the DRS transmission window of the neighbor cell.

A further apparatus is described. The apparatus may include a processor, memory in electronic communication with the processor, and instructions stored in the memory. The instructions may be operable to cause the processor to determine one or more parameters associated with a DRS transmission window of a neighbor cell and transmit a message that includes a DMTC to a UE, wherein the DMTC is based at least in part on the one or more parameters associated with the DRS transmission window of the neighbor cell.

A non-transitory computer readable medium for wireless communication is described. The non-transitory computer-readable medium may include instructions to cause a processor to determine one or more parameters associated with a DRS transmission window of a neighbor cell and transmit a message that includes a DMTC to a UE, where the DMTC is based on the one or more parameters associated with the DRS transmission window of the neighbor cell.

In some examples of the method, apparatus, or non-transitory computer-readable medium described above, the DMTC comprises a configuration for a connected mode of the UE. In some examples of the method, apparatus, or non-transitory computer-readable medium described above, the DMTC comprises a configuration for an idle mode of the UE.

In some examples of the method, apparatus, or non-transitory computer-readable medium described above, the one or more parameters associated with the DRS transmission window comprise a DRS transmission window offset parameter, a DRS transmission window periodicity parameter, or a DRS transmission window length parameter.

Some examples of the method, apparatus, or non-transitory computer-readable medium described above may further include processes, features, means, or instructions for receiving signaling from the UE that indicates a UE estimate of the one or more parameters associated with the DRS transmission window of the neighbor cell, where the UE estimate is associated with a cell or a frequency, and where the one or more parameters are determined based on the estimate.

Some examples of the method, apparatus, or non-transitory computer-readable medium described above may further include processes, features, means, or instructions for receiving a measurement report from the UE, where the one or more parameters associated with the DRS transmission window of the neighbor cell are determined based on the measurement report.

Some examples of the method, apparatus, or non-transitory computer-readable medium described above may further include processes, features, means, or instructions for identifying a time stamp of the measurement report, where the one or more parameters associated with the DRS transmission window of the neighbor cell are determined based on the time stamp of the measurement report.

Some examples of the method, apparatus, or non-transitory computer-readable medium described above may further include processes, features, means, or instructions for estimating a DRS transmission window periodicity, a DRS transmission window offset, or a DRS transmission window length for the neighbor cell. Some examples of the method, apparatus, or non-transitory computer-readable medium described above may further include processes, features, means, or instructions for configuring the UE to perform a measurement of the neighbor cell based on the DRS transmission window periodicity, the DRS transmission window offset, or the DRS transmission window length, where the measurement report is based on the measurement.

In some examples of the method, apparatus, or non-transitory computer-readable medium described above, configuring the UE to perform the measurement comprises: configuring the UE to perform the measurement for subframes that use DRS specific scrambling. In some examples of the method, apparatus, or non-transitory computer-readable medium described above, the estimated DRS transmission window periodicity, the estimated DRS transmission window offset, or the DRS transmission window length is based on an interval comprising a maximum number of reference signal received power (RSRP) observations.

In some examples of the method, apparatus, or non-transitory computer-readable medium described above, a periodicity of the DMTC is an integer multiple or an integer divisor of a periodicity of a DRS transmission window, or where an on duration or an offset of the DMTC are configured to include at least a portion of the DRS transmission window.

Some examples of the method, apparatus, or non-transitory computer-readable medium described above may further include processes, features, means, or instructions for storing the one or more parameters associated with the DRS transmission window of the neighbor cell. Some examples of the method, apparatus, or non-transitory computer-readable medium described above may further include processes, features, means, or instructions for transmitting a subsequent message comprising a subsequent DMTC based on the one or more stored parameters.

In some examples of the method, apparatus, or non-transitory computer-readable medium described above, the DMTC comprises a set of parameters corresponding to a set of frequencies. Some examples of the method, apparatus, or non-transitory computer-readable medium described above may further include processes, features, means, or instructions for transmitting an indication of a subframe type in a field of an eSIB or a common physical downlink control channel (PDCCH) message, where the subframe type comprises a multimedia broadcast single frequency network (MBSFN) type or a non-MBSFN type.

Some examples of the method, apparatus, or non-transitory computer-readable medium described above may further include processes, features, means, or instructions for transmitting a DRS indication for a subsequent subframe. Some examples of the method, apparatus, or non-transitory computer-readable medium described above may further include processes, features, means, or instructions for transmitting a DRS indication for a subsequent subframe.

Some examples of the method, apparatus, or non-transitory computer-readable medium described above may further include processes, features, means, or instructions for transmitting of a control region restriction for a subsequent DRS. Some examples of the method, apparatus, or non-transitory computer-readable medium described above may further include processes, features, means, or instructions for transmitting an indication of a subframe type in UE specific layer 1 signaling.

A method of wireless communication is described. The method may include identifying a DMTC for a UE, identifying a paging frame based at least in part on the DMTC and transmitting a paging message to a UE during the identified paging frame.

An apparatus for wireless communication is described. The apparatus may include means for identifying a DMTC for a UE, means for identifying a paging frame based at least in part on the DMTC and means for transmitting a paging message to a UE during the identified paging frame.

A further apparatus is described. The apparatus may include a processor, memory in electronic communication with the processor, and instructions stored in the memory. The instructions may be operable to cause the processor to identify a DMTC for a UE, identify a paging frame based at least in part on the DMTC and transmit a paging message to a UE during the identified paging frame.

A non-transitory computer readable medium for wireless communication is described. The non-transitory computer-readable medium may include instructions to cause a processor to identify a DMTC for a UE, identify a paging frame based on the DMTC and transmit a paging message to a UE during the identified paging frame.

Some examples of the method, apparatus, or non-transitory computer-readable medium described above may further include processes, features, means, or instructions for determining a number of paging frames, where the number of paging frames is scaled by a number of candidate paging frames that overlap with frames associated with the DMTC, and where the paging frame is identified based on the number of paging frames.

Some examples of the method, apparatus, or non-transitory computer-readable medium described above may further include processes, features, means, or instructions for determining a number of paging opportunities in the paging frame based on the DMTC.

A method of wireless communication is described. The method may include transmitting an indication of one or more parameters associated with a DRS transmission window of a neighbor cell and receiving a message comprising a DMTC that is based at least in part on the one or more parameters.

An apparatus for wireless communication is described. The apparatus may include means for transmitting an indication of one or more parameters associated with a DRS transmission window of a neighbor cell and means for receiving a message comprising a DMTC that is based at least in part on the one or more parameters.

A further apparatus is described. The apparatus may include a processor, memory in electronic communication with the processor, and instructions stored in the memory. The instructions may be operable to cause the processor to transmit an indication of one or more parameters associated with a DRS transmission window of a neighbor cell and receive a message comprising a DMTC that is based at least in part on the one or more parameters.

A non-transitory computer readable medium for wireless communication is described. The non-transitory computer-readable medium may include instructions to cause a processor to transmit an indication of one or more parameters associated with a DRS transmission window of a neighbor cell and receive a message comprising a DMTC that is based on the one or more parameters.

In some examples of the method, apparatus, or non-transitory computer-readable medium described above, the DMTC comprises a configuration for connected mode Radio Resource Management (RRM) measurements or RLM measurements. Some examples of the method, apparatus, or non-transitory computer-readable medium described above may further include processes, features, means, or instructions for performing a measurement on the neighbor cell while in an idle mode based on the DMTC.

Some examples of the method, apparatus, or non-transitory computer-readable medium described above may further include processes, features, means, or instructions for identifying a DRS of the neighbor cell, where the indication of the one or more parameters associated with the DRS transmission window of the neighbor cell is based on the DRS. Some examples of the method, apparatus, or non-transitory computer-readable medium described above may further include processes, features, means, or instructions for identifying a DRS transmission window of the neighbor cell based on the DRS.

In some examples of the method, apparatus, or non-transitory computer-readable medium described above, the DRS transmission window of the neighbor cell is identified based on a signature of a primary synchronization signal (PSS), a secondary synchronization signal (SSS), or a cell-specific reference signal (CRS). In some examples of the method, apparatus, or non-transitory computer-readable medium described above, the DRS transmission window of the neighbor cell is identified based on a redundancy version of a physical broadcast channel (PBCH) transmission.

In some examples of the method, apparatus, or non-transitory computer-readable medium described above, the DRS transmission window of the neighbor cell is identified based on a field of a master information block (MIB). Some examples of the method, apparatus, or non-transitory computer-readable medium described above may further include processes, features, means, or instructions for determining that a CRS scrambling code does not match an expected subframe index, where the expected subframe index is determined based on a time between a first subframe and a second subframe having known CRS scrambling code, or on an explicit subframe index indication.

Some examples of the method, apparatus, or non-transitory computer-readable medium described above may further include processes, features, means, or instructions for identifying a number of symbols that comprise a portion of the DRS. Some examples of the method, apparatus, or non-transitory computer-readable medium described above may further include processes, features, means, or instructions for decoding an eSIB based on the number of symbols.

Some examples of the method, apparatus, or non-transitory computer-readable medium described above may further include processes, features, means, or instructions for decoding an eSIB using a pre-determined number of symbols in the absence of an explicit indication of the pre-determined number of symbols.

In some examples of the method, apparatus, or non-transitory computer-readable medium described above, a scrambling code used for a physical downlink shared channel (PDSCH) portion of an eSIB and a control channel search space for the eSIB are based on a subframe index. In some examples of the method, apparatus, or non-transitory computer-readable medium described above, a scrambling code used for a PDSCH portion of an eSIB or a control channel search space for the eSIB or for a paging channel are based on a scrambling code used by a CRS transmission during a same subframe as the PDSCH portion of the eSIB.

Some examples of the method, apparatus, or non-transitory computer-readable medium described above may further include processes, features, means, or instructions for determining a subframe number using PBCH decoding. Some examples of the method, apparatus, or non-transitory computer-readable medium described above may further include processes, features, means, or instructions for identifying subframe-specific scrambling information or search space information for paging control or data decoding based on the subframe number.

Some examples of the method, apparatus, or non-transitory computer-readable medium described above may further include processes, features, means, or instructions for determining one or more scrambling codes of an eSIB using multiple hypothesis testing. Some examples of the method, apparatus, or non-transitory computer-readable medium described above may further include processes, features, means, or instructions for decoding the eSIB or a paging message based on the one or more scrambling codes.

Some examples of the method, apparatus, or non-transitory computer-readable medium described above may further include processes, features, means, or instructions for identifying a DRS transmission window of the neighbor cell based on a system frame number where the DRS transmission window occurs.

Some examples of the method, apparatus, or non-transitory computer-readable medium described above may further include processes, features, means, or instructions for identifying a trigger condition comprising a signal quality condition, a location of a UE, or an opportunistic measurement condition. Some examples of the method, apparatus, or non-transitory computer-readable medium described above may further include processes, features, means, or instructions for monitoring the neighbor cell or a serving cell based on a connected mode configuration of the DMTC and the trigger condition.

Some examples of the method, apparatus, or non-transitory computer-readable medium described above may further include processes, features, means, or instructions for identifying a trigger condition. Some examples of the method, apparatus, or non-transitory computer-readable medium described above may further include processes, features, means, or instructions for monitoring the neighbor cell based on the trigger condition during a period outside of a DMTC interval associated with a connected mode configuration of the DMTC.

In some examples of the method, apparatus, or non-transitory computer-readable medium described above, the trigger condition comprises an explicit signal from a base station. In some examples of the method, apparatus, or non-transitory computer-readable medium described above, the trigger condition comprises an identification of one or more handover conditions, or of a low signal level from a serving cell.

Some examples of the method, apparatus, or non-transitory computer-readable medium described above may further include processes, features, means, or instructions for monitoring the neighbor cell for a DRS based on the DMTC. In some examples of the method, apparatus, or non-transitory computer-readable medium described above, the one or more parameters associated with the DRS transmission window of the neighbor cell comprise a DRS transmission window offset parameter, a DRS transmission window periodicity parameter, or a DRS transmission window length parameter.

In some examples of the method, apparatus, or non-transitory computer-readable medium described above, the indication comprises a time stamp of a measurement report. In some examples of the method, apparatus, or non-transitory computer-readable medium described above, a periodicity of the DMTC is an integer multiple or an integer divisor of a periodicity of a DRS transmission window, or where an on duration or an offset of the DMTC are configured to include at least a portion of the DRS transmission window.

Some examples of the method, apparatus, or non-transitory computer-readable medium described above may further include processes, features, means, or instructions for receiving a connected mode discontinuous reception (C-DRX) configuration from the serving cell. Some examples of the method, apparatus, or non-transitory computer-readable medium described above may further include processes, features, means, or instructions for identifying an absence of a scheduling transmission from the serving cell during an on duration of the C-DRX configuration. Some examples of the method, apparatus, or non-transitory computer-readable medium described above may further include processes, features, means, or instructions for monitoring the serving cell for the scheduling transmission during a DRS transmission window of the serving cell following the on duration.

A method of wireless communication is described. The method may include identifying a DMTC for idle mode operation and monitoring a paging channel during an on duration of the DMTC receive a paging message based at least in part on the monitoring.

An apparatus for wireless communication is described. The apparatus may include means for identifying a DMTC for idle mode operation and means for monitoring a paging channel during an on duration of the DMTC receive a paging message based at least in part on the monitoring.

A further apparatus is described. The apparatus may include a processor, memory in electronic communication with the processor, and instructions stored in the memory. The instructions may be operable to cause the processor to identify a DMTC for idle mode operation and monitor a paging channel during an on duration of the DMTC receive a paging message based at least in part on the monitoring.

A non-transitory computer readable medium for wireless communication is described. The non-transitory computer-readable medium may include instructions to cause a processor to identify a DMTC for idle mode operation and monitor a paging channel during an on duration of the DMTC receive a paging message based on the monitoring.

Some examples of the method, apparatus, or non-transitory computer-readable medium described above may further include processes, features, means, or instructions for refraining from further monitoring the paging channel during a paging frame after observing the paging message in the assigned paging opportunity of the paging frame.

A method of wireless communication is described. The method may include identifying one or more parameters of a transmission opportunity, wherein the one or more parameters comprise an upcoming special subframe, an upcoming uplink subframe, the start and the duration of an upcoming uplink burst, or the total length of a transmission opportunity and transmitting the one or more parameters in a broadcast message or in a common PDCCH.

An apparatus for wireless communication is described. The apparatus may include means for identifying one or more parameters of a transmission opportunity, wherein the one or more parameters comprise an upcoming special subframe, an upcoming uplink subframe, the start and the duration of an upcoming uplink burst, or the total length of a transmission opportunity and means for transmitting the one or more parameters in a broadcast message or in a common PDCCH.

A further apparatus is described. The apparatus may include a processor, memory in electronic communication with the processor, and instructions stored in the memory. The instructions may be operable to cause the processor to identify one or more parameters of a transmission opportunity, wherein the one or more parameters comprise an upcoming special subframe, an upcoming uplink subframe, the start and the duration of an upcoming uplink burst, or the total length of a transmission opportunity and transmit the one or more parameters in a broadcast message or in a common PDCCH.

A non-transitory computer readable medium for wireless communication is described. The non-transitory computer-readable medium may include instructions to cause a processor to identify one or more parameters of a transmission opportunity, where the one or more parameters comprise an upcoming special subframe, an upcoming uplink subframe, the start and the duration of an upcoming uplink burst, or the total length of a transmission opportunity and transmit the one or more parameters in a broadcast message or in a common PDCCH.

A method of wireless communication is described. The method may include receiving a message using a broadcast channel or a common PDCCH and identifying one or more parameters of a transmission opportunity based at least in part on the received message, wherein the one or more parameters comprise an upcoming special subframe, an upcoming uplink subframe, the start and the duration of an upcoming uplink burst, or the total length of a transmission opportunity.

An apparatus for wireless communication is described. The apparatus may include means for receiving a message using a broadcast channel or a common PDCCH and means for identifying one or more parameters of a transmission opportunity based at least in part on the received message, wherein the one or more parameters comprise an upcoming special subframe, an upcoming uplink subframe, the start and the duration of an upcoming uplink burst, or the total length of a transmission opportunity.

A further apparatus is described. The apparatus may include a processor, memory in electronic communication with the processor, and instructions stored in the memory. The instructions may be operable to cause the processor to receive a message using a broadcast channel or a common PDCCH and identify one or more parameters of a transmission opportunity based at least in part on the received message, wherein the one or more parameters comprise an upcoming special subframe, an upcoming uplink subframe, the start and the duration of an upcoming uplink burst, or the total length of a transmission opportunity.

A non-transitory computer readable medium for wireless communication is described. The non-transitory computer-readable medium may include instructions to cause a processor to receive a message using a broadcast channel or a common PDCCH and identify one or more parameters of a transmission opportunity based on the received message, where the one or more parameters comprise an upcoming special subframe, an upcoming uplink subframe, the start and the duration of an upcoming uplink burst, or the total length of a transmission opportunity.

Some examples of the method, apparatus, or non-transitory computer-readable medium described above may further include processes, features, means, or instructions for determining whether to perform an uplink (UL) transmission corresponding to a previously provided UL grant based on the one or more parameters, where the UL transmission comprises a physical uplink shared channel (PUSCH) transmission, a PUCCH transmission, or a physical random access channel (PRACH) transmission.

DETAILED DESCRIPTION

Figure 1:
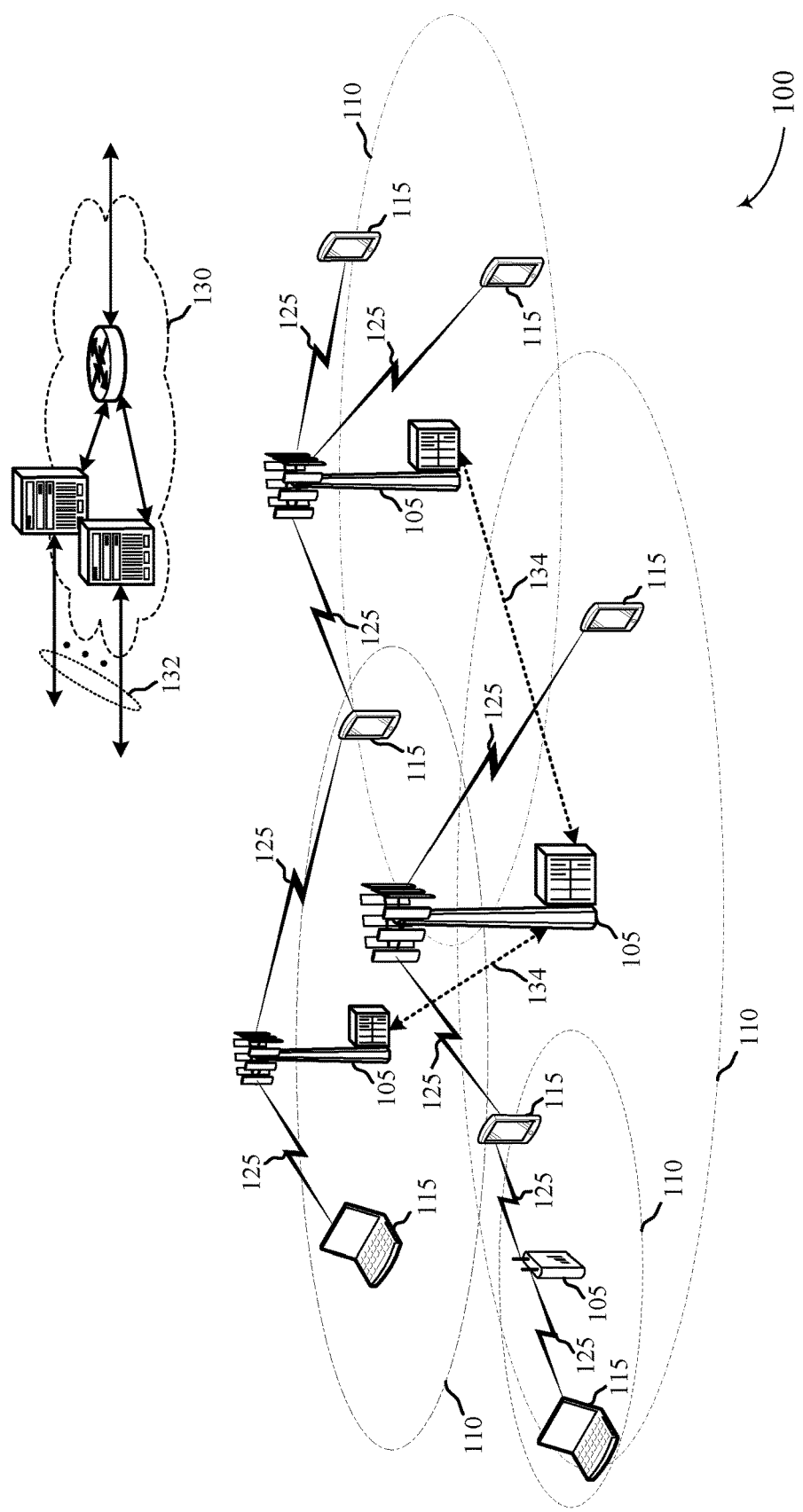
FIG. 1 illustrates an example of a wireless communications system that supports discovery reference signal (DRS) transmission window (DTXW) detection and discovery signal measurement configuration in accordance with aspects of the present disclosure.

A user equipment (UE) may use discovery reference signals (DRS) in order to perform measurements on serving or neighbor cells. DRS may include synchronization signals, cell specific reference signals, a master information block (MIB) and other signaling useful for identifying or attaching to a cell. A base station may transmit DRS during periodically configured DRS transmission windows (DTWs). The UE may measure cell DRS according to periodically configured DRS measurement timing configuration (DMTC) periods. The DMTC may be configured for measurements of a serving cell or neighbor cells, or both. Further, the DMTC may be frequency specific or may be applicable multiple frequencies in various examples.

In some cases, A UE may monitor for DRS for multiple cells that may or may not be synchronized in time. Cells that are not synchronized in time may have periodic DTXWs that are also not aligned in time. That is, a DMTC and a DTXW of a nearby cell may not overlap. Further, the UE may operate without regard to the extent to which the DMTC overlaps with the DTXW of serving or nearby cells.

As described herein, a UE may identify a DRS of a cell in order to estimate a DTXW subframe offset, periodicity, and length. A UE may then explicitly or implicitly signal the neighboring cell's DTXW parameters to a serving base station based on the measurements. DTXW subframes may also be detected by observing non-subframe-specific common reference signals (CRS). In some cases, a UE or base station may use measurement observations to determine DTXW parameter hypotheses and may subsequently attempt to verify a chosen DTXW hypothesis. In some cases, previously determined DTXW information may be cached (by a base station or by a UE) to configure future DTXWs.

Base stations may configure UEs with a DMTC for connected mode or idle mode measurements in order to take more accurate and rapid measurements of a neighbor cell of interest, while limiting power drain on the UEs. A base station may also allow a UE to measure neighbor cells outside of the DMTC to trigger handover. Using a DMTC for radio link monitoring (RLM) may result in reduced power consumption. A DMTC idle mode may be configured to reduce the number of searches performed. Paging UEs only during a DTXW (i.e., so that a UE may monitor a paging channel at the same time it performs camping cell measurements) may also reduce power consumption.

In some examples, a UE may determine that a DRS is not received during a DTXW, which may be due to a failure of a cell to win contention for a channel, for example, in a shared radio frequency spectrum band. In such cases, the UE may signal that the DRS has been blocked rather than declaring a radio link failure (RLF) due to non-receipt of the DRS. In some examples, a UE may monitor a subset of resources of a DTXW (e.g., a narrowband portion of a DRS bandwidth, or a channel or a subset of channels within the DTXW other than a channel containing the DRS), and make a determination of DRS blocking based on the subset of resources. Such monitoring may allow lower complexity of detection in situations where the UE is not explicitly monitoring for DRS. In some examples, the UE may report RLM parameters based on DRS detection failure rather than that the DRS has been blocked.

In some examples, a random access channel (RACH) procedure may be configured between a UE and a base station, which may include both a two-step and a four-step RACH procedure. In some cases, the UE may be allowed to decide between the two-step and four-step RACH procedure autonomously or semi-autonomously, based on configuration. In some examples, a first subset of random access resources may be provided for the two-step RACH procedure, and a second subset of random access resources may be provided for the four-step RACH procedure. In some examples, the first subset of resources may be a first subset of interlaces of a set of RACH resources, and the second subset of resources may be a second subset of interlaces of the set of RACH resources.

Aspects of the disclosure introduced above, and additional features, are described next in the context of a wireless communication system. Examples of DTXW parameter estimation are then described. Aspects of the disclosure are further illustrated by and described with reference to apparatus diagrams, system diagrams, and flowcharts that relate to DTXW detection and discovery signal measurement configuration.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. For example, wireless communications system 100 may include an LTE/LTE-A network, a MulteFire network, a neutral host small cell network, or the like, operating with overlapping coverage areas. A MulteFire network may include access points (APs) and/or base stations 105 communicating in an unlicensed radio frequency spectrum band, e.g., without a licensed frequency anchor carrier. For example, the MulteFire network may operate without an anchor carrier in the licensed spectrum. Wireless communications system 100 may support DMTC based on DTXW configuration of neighboring cells, which may, e.g., increase the efficiency of MulteFire communications within wireless communications system 100.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105 and downlink (DL) transmissions from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Base stations 105 may also be MulteFire base stations 105, which may have limited or non-ideal backhaul links 134 with other base stations 105.

In some cases, a UE 115 or base station 105 may operate in a shared or unlicensed frequency spectrum. These devices may perform a clear channel assessment (CCA) prior to communicating in order to determine whether the channel is available. A CCA may include an energy detection procedure to determine whether there are any other active transmissions. For example, the device may infer that a change in a reference signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. UEs 115 and base stations 105 operating in licensed or unlicensed spectrum may use DRS transmissions to convey information for identification or establishment of a radio connection.

For example, DRS may include primary and secondary synchronization signals (PSS and SSS, respectively) to enable a UE 115 to identify the timing and frequency range of a cell. After completing initial cell synchronization, a UE 115 may decode the master information block (MIB). The MIB may be transmitted on physical broadcast channel (PBCH) and may utilize the first 4 orthogonal frequency division multiple access (OFDMA) symbols of the second slot of the first subframe of each radio frame. It may use the middle 6 resource block (RBs) (i.e., 72 subcarriers) in the frequency domain. The MIB carries important information for UE initial access, including: DL channel bandwidth in term of RBs, physical hybrid automatic repeat request (HARM) indicator channel (PHICH) configuration (duration and resource assignment), and system frame number (SFN). A new MIB may be broadcast every fourth radio frame (i.e., SFN mod 4=0) and rebroadcast every frame (10 ms) until a new MIB is generated. Each repetition may be scrambled with a different scrambling code.

After reading a MIB (either a new version or a copy), the UE 115 may try different phases of a scrambling code until it gets a successful cyclic redundancy check (CRC). The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase.

After receiving the MIB, a UE may receive one or more system information block (SIBs). Different SIBs may be defined according to the type of system information (SI) conveyed and they may be defined for licensed frequency operation or unlicensed frequency operation, or both. As described below, certain Ms may be used by UEs 115 operating under a MulteFire scheme within wireless communications system 100, while other SIBs may be used by UEs 115 operating on licensed frequencies.

For example, a UE 115 operating on licensed frequencies may decode SIB1 and SIB2, in addition to the MIB, prior to accessing the network. A new SIB1 may be transmitted in the fifth subframe of every eighth frame (i.e., SFN mod 8=0) and rebroadcast every other frame (20 ms). SIB1 includes access information, including cell identity (CID) information, and it may indicate whether a UE is allowed to camp on a cell of a base station 105. SIB1 also includes cell selection information (or cell selection parameters). Additionally, SIB1 includes scheduling information for other Ms. SIB2 may be scheduled dynamically according to information in SIB1, and includes access information and parameters related to common and shared channels. The periodicity of SIB2 can be set to 8, 16, 32, 64, 128, 256 or 512 radio frames. In some cases, the periodicity and configuration of MIB and SIBs may be different for cells operating in licensed and unlicensed spectrum.

After the UE 115 decodes SIB2, it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an UL resource grant, a timing advance and a temporary cell radio network temporary identity (C-RNTI). The UE 115 may then transmit a radio resource control (RRC) connection request, or RACH message 3, along with a temporary mobile subscriber identity (TMSI) (e.g., if the UE 115 has previously been connected to the same wireless network) or a random identifier.

The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification (ID), it may proceed with RRC setup. If the UE 115 does not receive a contention resolution message (e.g., if there is a conflict with another UE 115) it may repeat the RACH process by transmitting a new RACH preamble.

For UEs 115 operating on unlicensed frequencies, including those operating on MulteFire portions of wireless communications system 100, the UE 115 may decode an enhanced SIB (eSIB). The eSIB may be broadcast (e.g., on PBCH) and may include system information equivalent to some fields or information included in other SIBs. For example, the eSIB may include information that may also be conveyed in SIB1 and SIB2 in licensed frequency operation, as described above. In some cases, the eSIB may include an indication of subframe configurations including, for example, whether certain subframes are multimedia broadcast single frequency network (MBSFN) subframes. The eSIB may support unlicensed operation because it may quickly provide information (e.g., frame-type or subframe configuration) to a UE 115 after cell acquisition.

In some cases, a UE 115 may monitor a communication link 125 continuously for an indication that the UE 115 may receive data. In other cases (e.g., to conserve power and extend battery life) a UE 115 may be configured with a discontinuous reception (DRX) cycle. A DRX cycle includes an "on duration" when the UE 115 may monitor for control information (e.g., on physical downlink control channel (PDCCH) or common PDCCH (C-PDCCH)) and a "DRX period" when the UE 115 may power down radio components. In some cases, a UE 115 may be configured with a short DRX cycle and a long DRX cycle. In some cases, a UE 115 may enter a long DRX cycle if it is inactive for one or more short DRX cycles.

The transition between the short DRX cycle, the long DRX cycle and continuous reception may be controlled by an internal timer or by messaging from a base station 105. A UE 115 may receive scheduling messages on PDCCH during the on duration. While monitoring PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer." When the DRX Short Cycle Timer expires, the UE 115 may resume a long DRX cycle. In some cases, a UE may be configured with either a connected mode DRX cycle or an idle mode DRX cycle. A DRX cycle may be configured in addition to a configuration for measuring DRS (i.e., a DMTC).

For example, a DRX mode may enable a UE 115 to enter an idle mode and periodically wake up to receive paging messages. In some cases, a UE 115 in idle mode may be assigned a paging radio network temporary identity (P-RNTI). If the serving gateway (S-GW) receives data for the UE 115, it may notify the mobility management entity (MME), which may send a paging message to every base station 105 within an area known as a tracking area. Each base station 105 within the tracking area may send a paging message with the P-RNTI. Thus, the UE may remain in idle mode without updating the MME until it leaves the tracking area.

Some base stations 105 may utilize a portion of the available DL bandwidth to broadcast multimedia data to some or all UEs 115 within the geographic coverage area 110. For example, a wireless communication system may be configured to broadcast mobile TV content, or to multicast live event coverage to UEs 115 located near a live event such as a concert or sporting event. In some cases, this may enable more efficient utilization of the bandwidth. These base stations may be referred to as multimedia broadcast multicast service (MBMS) or evolved multimedia broadcast multicast service (eMBMS) cells. In some cases, MBMS cells may be grouped together in a MBSFN wherein the broadcast media is transmitted on the same frequency resources by each supporting cell. However, some UEs 115 in the coverage area may elect not to receive the MBMS data. In some cases, a subframe type (i.e., either MBSFN or non-MBSFN) may be indicated by a base station 105 in a broadcast transmission, a C-PDCCH transmission, or in a UE-specific eSIB, as mentioned above.

A base station 105 may also provide a UE 115 with a measurement reporting configuration as part of an RRC configuration. The measurement reporting configuration may include parameters related to which neighbor cells and frequencies the UE 115 should measure, criteria for sending measurement reports, intervals for transmission of measurement reports (i.e., measurement gaps), and other related information. In some cases, measurement reports may be triggered by events related to the channel conditions of the serving cells or the neighbor cells.

For example, in an LTE system a first report (A1) may be triggered when the serving cell becomes better than a threshold; a second report (A2) when the serving cell becomes worse than a threshold; a third report (A3) when a neighbor cell becomes better than the primary serving cell by an offset value; a fourth report (A4) when a neighbor cell becomes better than a threshold; a fifth report (A5) when the primary serving cell becomes worse than a threshold and a neighbor cell is simultaneously better than another (e.g., higher) threshold; a sixth report (A6) when a neighbor cell becomes better than a secondary serving cell by an offset value; a seventh report (B1) when a neighbor using a different radio access technology (RAT) becomes better than a threshold; and an eighth report (B2) when a primary serving cell becomes worse than a threshold and the inter-RAT neighbor becomes better than another threshold.

Other reporting configurations may also be possible. In some cases, the UE 115 may wait for a time interval known as time-to-trigger (TTT) to verify that the trigger condition persists before sending a report. Other reports may be sent periodically instead of being based on a trigger condition (e.g., every two seconds a UE 115 may transmit an indication of a transport block error rate).

A base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (e.g., up to 4) of the receiving UEs 115. In addition to CRS, which may be utilized by all UEs 115 in the geographic coverage area 110 of the base station 105, demodulation reference signal (DMRS) may be directed toward specific UEs 115 and may be transmitted only on resource blocks assigned to those UEs 115.

DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating CSI. On the UL, a UE 115 may transmit a combination of periodic sounding reference signal (SRS) and UL DMRS for link adaptation and demodulation, respectively.

In some cases, wireless communications system 100 may utilize one or more enhanced component carriers (eCCs). An eCC may be characterized by one or more features including flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

As described herein, a UE 115 may monitor a neighbor cell and report the result to a serving base station 105. Based on the report, the serving base station 105 may identify an estimated DTXW of the neighbor cell. A DTXW may refer to a time period or window that a base station 105 is expected to transmit DRS. In some cases, the UE 115 may estimate and report parameters of the neighbor DTXW, and in other cases, the UE 115 may simply make a measurement report and the base station 105 may infer DTXW parameters. The base station 105 may then provide the UE 115 with a DMTC based on the estimated parameters of the neighbor cell so that the UE 115 may monitor the neighbor cell and the serving cell in an efficient manner. For example, the UE 115 may conserve battery life by refraining from monitoring DRS during periods when a DRS transmission is not likely.

In some examples, the UE 115 may determine that a DRS is not received during a DTXW due to a failure of a cell to win contention for a channel in a shared radio frequency spectrum band. In such cases, the UE 115 may signal that the DRS has been blocked rather than declaring a RLF due to non-receipt of the DRS. In some examples, UE 115 may monitor a subset of resources of a DTXW (e.g., a narrowband portion of a DRS bandwidth, or a channel or a subset of channels within the DTXW other than a channel containing the DRS), and make a determination of DRS blocking based on the subset of resources. In some examples, the UE 115 may report RLM parameters based on DRS detection failure rather than that the DRS has been blocked.

In some examples, a RACH procedure may be configured between a UE 115 and a base station 105. In some examples, the base station 105 may support both a two-step and a four-step RACH procedure. In some cases, the UE 115 may be allowed to decide between the two-step and four-step RACH procedure autonomously or semi-autonomously, based on configuration. For example, the decision may be based on metrics such as channel quality, and the base station 105 may advertise (e.g., via eSIB) selection criteria, such as thresholds for one or more metrics, and the UE 115 may select the RACH procedure based on the selection criteria.

Figure 2:
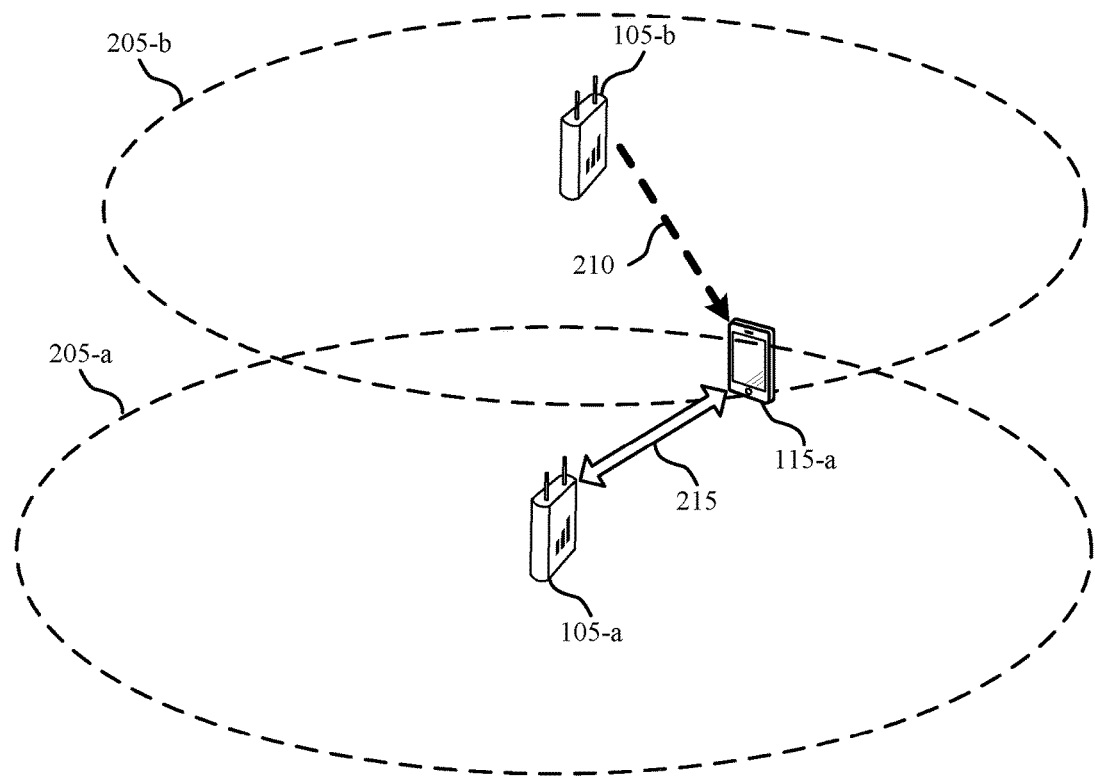
FIG. 2 illustrates an example of a wireless communications system that supports DTXW detection and discovery signal measurement configuration in accordance with aspects of the present disclosure.

FIG. 2 illustrates an example of a wireless communications system 200 for DTXW detection and discovery signal measurement configuration. Wireless communications system 200 may include UE 115-a and base stations 105-a and 105-b (supporting serving cell 205-a and neighbor cell 205-b, respectively), which may be examples of the corresponding devices described with reference to FIG. 1. Wireless communications system 200 may include base stations 105 (e.g., employing a MulteFire scheme) that support DMTC based on DTXW configuration of neighboring cells.

UE 115-a may be camped on, or connected to, serving cell 205-a and may use DRS 210 in order to perform measurements on neighbor cell 205-*b*. UE 115-*a* and base station 105-*a* may communicate via communications link 215. Base station 105-*a* and base station 105-*b* may transmit DRS (e.g., on serving cell 205-*a* and neighbor cell 205-*b*, respectively) during a periodically configured DTXW. UE 115-*a* may measure the DRS according to periodically configured monitoring periods (e.g., a DMTC). The DMTC may apply to serving cell 205-*a*, neighbor cell 205-*b*, or both. Further, the DMTC may be applicable to one or multiple frequency ranges.

UE 115-*a* may search for DRS for multiple cells that may or may not be synchronized in time. Cells that are not synchronized in time may have periodic DTXWs that are also not aligned in time (e.g., cell 205-*a* and cell 205-*b* have DTXWs not aligned in time). Additionally or alternatively, DMTC configured to UE 115-*a* and a DTXW of serving cell 205-*a* or neighbor cell 205-*b* may not overlap. Further, UE 115-*a* may not know the extent to which the DMTC overlaps with the DTXW of serving cell 205-*a* or of neighbor cell 205-*b*.

UE 115-*a* may explicitly or implicitly signal neighbor cell DTXW parameters to base station 105-*a*. For example, the UE 115-*a* may explicitly indicate a DTXW offset (e.g., of base station 105-*b*) by signaling an offset indicator to base station 105-*a* via communications link 215. Alternatively, base station 105-*a* may derive a DTXW configuration of base station 105-*b* from UE reports from UE 115-*a*. UE reports may include timing and measurement information associated with neighbor cell 205-*b* to be used by base station 105-*a* in order to determine neighbor cell 205-*b* DTXW parameters. For example, base station 105-*a* may associate each UE report with a time stamp.

Further, base station 105-*a* may determine a DTXW periodicity by asking UE 115-*a* to measure at specific periodicities and timing offsets. UE 115-*a* may use measurement gaps provided by base station 105-*a* to enable measurement on other frequencies (e.g., for inter-frequency measurements).

UE 115-*a* may determine whether or not a subframe is part of a DTXW in order to identify a DTXW subframe offset. For example, a PSS/SSS special signature may be utilized where the DRS uses a specific synchronization channel with higher diversity. UE 115-*a* may also determine a subframe is part of a DTXW by determining a redundancy version (RV) or a MIB, as the first occurrence (e.g., RV0) of PBCH may fall in DTXW. The redundancy version may include a one bit field to indicate if the DRS belongs to a DTXW or if the DRS is outside a DTXW (e.g., bit is valid if DRS belongs to DTXW). The MIB payload (and therefore subframe offset number) may remain the same for all RVs of enhanced PBCH (ePBCH) and may be reset at every DTXW opportunity. Thus, UE 115-*a* may use the one bit MIB indicator to decide whether to use the subframe offset indicator in the MIB to determine the subframe number.

DTXW subframes may also be detected by observing non-subframe-specific CRS (e.g., observing a sequence of CRS signatures that is inconsistent with consecutive indexing of subframes). That is, CRS signatures may be used to determine potential ranges of subframes that are a part of a DTXW. For example, CRS scrambling known to correspond to certain subframe indices (e.g., subframe n with subframe 0 CRS scrambling followed by subframe n+1 with subframe 4 CRS scrambling) may be observed and may be associated with a subframe known to be in a DTXW. In some examples, it may be determined that subframes n−3, n−2, n−1, n are part of DTXW, since n+1 may correspond to a subframe index of 4, and subframe n, corresponding to subframe index 3, may therefore have been scrambled with a CRS for subframe index 0 if it was in DTXW. Furthermore, in some cases, preceding subframes in the same frame may be part of the DTXW. In some cases the range of subframes in a DTXW may be precisely determined. In other examples, the range of subframes in a DTXW may be estimated, or a UE 115-*a* may use the sequence of subframes to eliminate a number of previously unverified DTXW hypotheses.

The duration of a DRS may be unknown. The DRS may consist of 12 or 14 orthogonal frequency division multiplexing (OFDM) symbols. An eSIB may also be 12 or 14 symbols, and the length may be indicated by a C-PDCCH or by a UE-specific PDCCH that schedules the eSIB. UE 115-*a* may use this length information to decode the eSIB. If the length information is not available, UE 115-*a* may use either 12 or 14 symbols for eSIB decoding.

UE 115-*a* may use observations of measurements to determine DTXW parameter hypotheses. Hypotheses of approximate DTXW parameters may arise from repeated measurements or patterns observed in measurements (e.g., reference signal received power (RSRP) measurements). UE 115-*a* may be configured to only measure RSRP in subframes with pilots scrambled with DRS-specific scrambling (e.g., only subframe 0 and subframe 5 scrambling). UE 115-*a* or base station 105-*a* may find offset intervals where the largest RSRP observations are clustered or have the highest median. Additionally or alternatively, UE 115-*a* or base station 105-*a* may consider the offset where the maximum number of RSRPs are clustered. UE 115-*a* and base station 105-*a* may maintain multiple potential DTXW offsets and periodicities per neighbor cell (e.g., base station 105-*b*).

Base station 105-*a* or UE 115-*a* may attempt to verify a chosen DTXW hypothesis. To verify a determined hypothesis, the base station 105-*a* or UE 115-*a* may target measurements (e.g., via DMTC gating) at the determined hypothesis offsets and/or periodicities. Assumptions may be verified by observing a high chance of detecting RSRP in line with loading conditions or by determining the RSRP magnitude exceeds or is equal to the RSRP measurements on surrounding subframes.

Base station 105-*a* may configure UE 115-*a* with a DMTC for connected mode measurements in order to take more accurate and rapid measurements of a neighbor cell of interest (e.g., neighbor cell 205-*b*). For example, deterioration of base station 105-*a* serving quality may trigger (e.g., A2 trigger) a neighbor cell (e.g., neighbor cell 205-*b*) measurement. In addition, if a target cell is previously known to be a successful cell for the UE 115-*a* location, UE 115-*a* may perform measurements on the target cell. Further, opportunistic (e.g., non-DTXW) target cell measurements may suggest a cell (e.g., neighbor cell 205-*b*) is a good neighbor and result in measurements of the cell.

Base station 105-*a* may allow UE 115-*a* to measure neighbor cells (e.g., neighbor cell 205-*b*) outside of the DMTC to trigger handover. UE 115-*a* may also autonomously decide to tune away from the serving frequency (e.g., during discontinuous transmission (DTX) idle) to measure inter-frequency neighbors outside of the DMTC. Intra-frequency neighbors may also be measured outside of the DMTC. UE 115-*a* may also tune away outside DTX idle, assuming base station 105-*a* will accommodate for the resulting scheduling outage (e.g., base station 105-*a* expects it, base station 105-*a* only reacts to explicit HARQ feedback, etc.).

A DMTC for RLM may result in reduced power consumption. That is, using a periodicity of a DMTC greater than or equal to a periodicity of a DTXW, or using an on period of a DMTC less than or equal to a size of the DTXW, may reduce power consumption. Base station 105-*a* may configure a DMTC to be smaller or less frequent than a DTXW of serving cell 205-*a*. UE 115-*a* may autonomously limit the RLM window size or periodicity. Both base station 105-*a* and UE 115-*a* may restrict a DMTC based on an expected DRS success rate (e.g., derived from load conditions, past observations, etc.).

UE 115-*a* may be expected to perform RLM on DTXW opportunities. When DRX is configured, UE 115-*a* may limit itself to those opportunities during a DRX ON time, which may or may not contain DTXW samples. Base station 105-*a* may specify when UE 115-*a* tunes to DTXW to increase base station 105-*a* scheduler performance and reduce UE 115-*a* power consumption. If no scheduling occurs (e.g., either at all or for the UE 115-*a*) during UE 115-*a* on duration, UE 115-*a* may listen to the DTXW at a certain time after (e.g., immediately following) the configured on-duration. Base station 105-*a* may be allowed to schedule UE 115-*a* in those DTXW subframes. In some cases, UE 115-*a* may tune DTXW opportunities if they were not scheduled during one or a configured multiple of previous on-duration occasions. Once scheduling occurs for UE 115-*a* in any one or configured multiple DTXW opportunities, UE 115-*a* may switch back to listening to on-duration for scheduling and RLM purposes.

Previously determined DTXW information may be cached to configure future DTXWs. For example, base station 105-*a* or UE 115-*a* may cache previous DTXW information for reuse at a later time. Thus, UE 115-*a* may reuse the cached information as a starting point if the same physical cell identity (PCI) is observed again within a given time (e.g., same subframe timing). Further, a base station may reuse DTXW information from one UE to configure measurements for a second UE.

Additionally or alternatively, an idle mode DMTC may be configured to reduce the number of searches performed during monitoring of neighbor cells. That is, UE 115-*a* may be provided with a DMTC idle window to search for neighbors (e.g., neighbor cell 205-*b*), as long as the condition of serving cell 205-*a* is above a threshold. UE 115-*a* may limit its searches to the configured DMTC if the quality of serving cell 205-*a* exceeds a threshold. DMTC idle window parameters may include an offset, periodicity, and length. Some or all of the DMTC idle window parameters may be provided on a per frequency basis.

Paging UE 115-*a* only during a DTXW may reduce power consumption (i.e., it may allow UE 115-*a* to limit monitoring the paging channel to the DMTC on durations). In some cases, a default paging framework may be reused to limit changes (e.g., as it relates to determining paging frames (PFs) and paging opportunities (POs)). A number of PFs may be scaled by the number of PFs overlapping with DMTC paging frames. For example, the number of frames may be determined as, $$N = \min\left(\frac{T}{nD}, nB\right)$$

where N is the number of pageable frames, nD is the DMTC paging period in frames (e.g., can be the same as the base station's DTXW period), and T and nB are already existing parameters. Alternatively, T may be defined as the number of DMTC POs such that $$Ns = \max\left(1, nB * \frac{nD}{T}\right)$$

In some cases, POs may be limited to some integer value (e.g., 1). Additional paging parameters may include the size (e.g., in subframes) of each PO and the offset (e.g., in subframes) applied to POs. UE 115-*a* may stop listening to POs after determining base station 105-*a* has addressed a paging-radio network temporary identifier (P-RNTI) or after determining base station 105-*a* has paged UE 115-*a*. For example, where the full range of Ns is larger than the number of POs, the unused range in Ns may be used to signal PO size or offset.

In some cases, base station 105-*a* may also transmit an indication of a subframe type (e.g., MBSFN or non-MBSFN) as part of a field in the eSIB, or in a field of a broadcast control channel, which may be referred to as a C-PDCCH. Layer 1 signaling (either UE-specific or cell-specific) may also be used to indicate subframe (SF) type (e.g., a physical control format indicator channel (PCFICH) or PHICH resource may be used). Base station 105-*a* may also transmit a DRS indication for subsequent subframes (i.e., may indicate whether an upcoming subframe will have a DRS). In some cases, a control region restriction may be indicated in the trigger subframe.

Additionally or alternatively, base station 105-*a* may transmit an indication of an upcoming special subframe, an upcoming uplink subframe, the start and the duration of an upcoming uplink burst, the total length of the transmission opportunity as part of a broadcast or C-PDCCH. Accordingly, UE 115-*a* may determine whether to perform an uplink transmission corresponding to a previously provided UL grant based on the contents of the C-PDCCH as a trigger. For example, UE 115-*a* may also determine whether to perform an uplink transmission of the short physical uplink control channel (sPUCCH) or physical random access channel (PRACH) based on the contents of the C-PDCCH as a trigger.

Figure 3A:
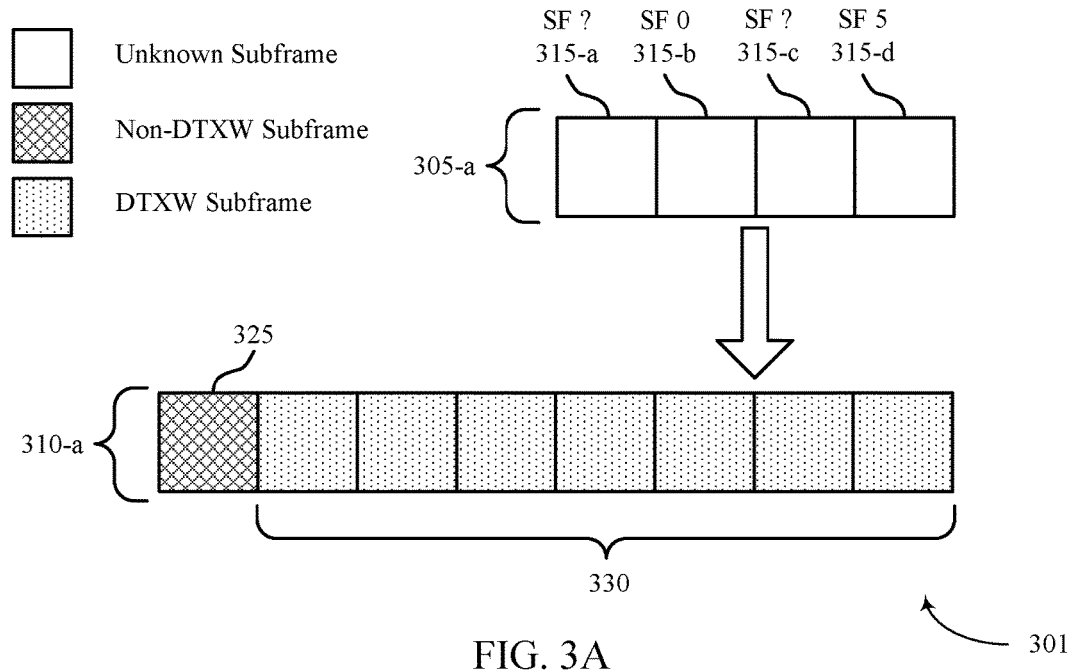
FIGS. 3A and 3B illustrate an examples of DTXW estimation to support discovery signal measurement configuration in accordance with aspects of the present disclosure.
Figure 3B:
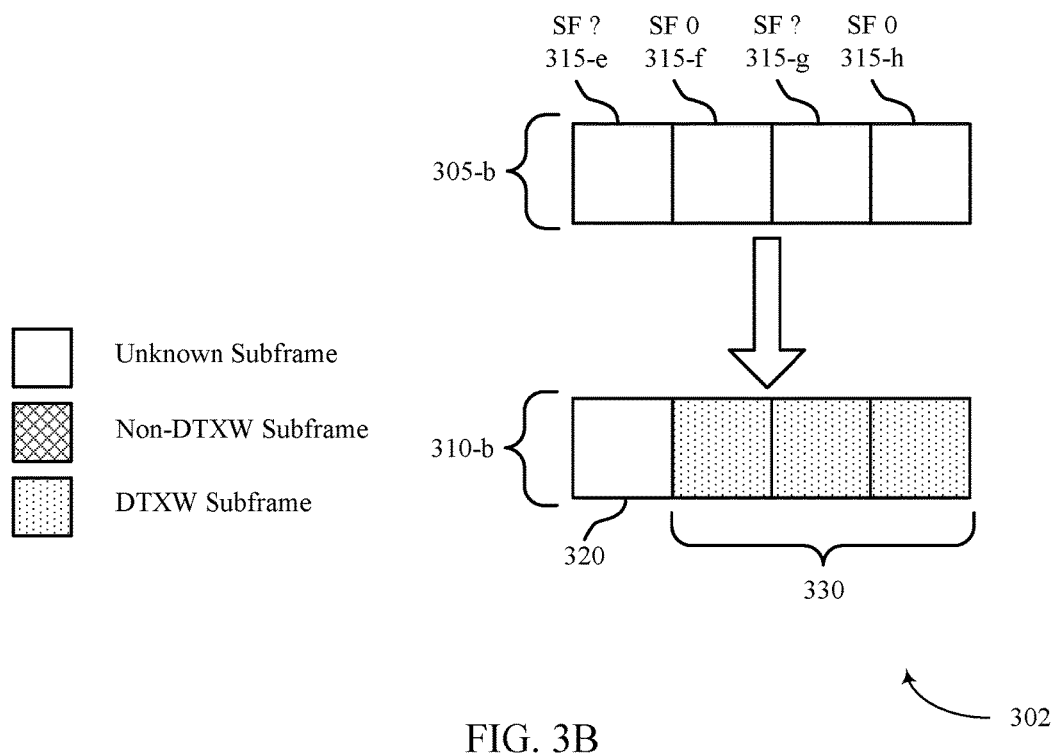

FIGS. 3A and 3B illustrate examples of DTXW estimation 301 and 302 to support discovery signal measurement configuration. In some cases, aspects of the present descriptions may represent aspects of techniques performed by a UE 115 or base station 105 as described with reference to FIGS. 1 and 2. DTXW estimations 301 and 302 illustrate examples where a UE 115 may measure an observed subframe configuration 305 and may use CRS signatures to identify an estimated subframe configuration 310.

CRS scrambling for a DRS subframe (SF) within DTXW may be pre-defined within a system or for certain groups of UEs. For example, CRS transmitted on SF 0 through 4 may use a first scrambling and CRS in SF 5 through 9 may use a second scrambling. Additionally, other signals or aspects of certain channels may employ similar signaling; for example, a subframe-specific scrambling may be used for a PDCCH search space. Likewise, PDSCH scrambling for an eSIB and PDSCH scrambling for paging may be similarly employed.

In some examples, CRS uses SF 0/5 scrambling while PDSCH, PDCCH, and other channels use subframe specific scrambling for DRS subframes in a DTXW. For serving and neighbor cells, a UE 115 may obtain subframe number and SFN from PBCH decoding, and may perform PDCCH and PDSCH decoding based on the subframe information obtained. In another example, all channels may use SF 0/5 scrambling on DRS subframes in DTXW. In these cases, a UE 115 may perform multiple hypothesis testing of an eSIB.

As depicted in the example of FIG. 3A, the subframe configuration 305-*a* may include subframes that are unknown to be inside or outside of a DTXW (e.g., unknown subframes 315-*a* and 315-*c*). For example, a UE may fail to identify a DRS or identify subframe 315-*a* with a non-subframe-specific CRS signature, subframe 315-*b* with a first CRS signature, and subframe 315-*c* with a second CRS signature.

The first CRS signature may imply the subframe is a 0-4 subframe while a second CRS signature may imply the subframe is in SF 5-9. Certain sequences of first CRS signatures and second CRS signatures may imply certain subframes lie within a DTXW. That is, sequences of CRS signatures in the observed subframe configuration 305-*a* may be used to determine non-DTXW subframes 325 and DTXW subframes 330 of the estimated subframe configuration 310-*a* (i.e., since a subframe with a first signature is followed shortly by a subframe with the second signature, it limits the possibilities for estimated DTXW subframes 330). In some cases, a specific window of estimated DTXW subframes 330 may be determined that excludes non-DTXW subframe 325.

According to the example depicted in FIG. 3B, a UE 115 may measure a different observed subframe configuration 305-*b* and may use CRS signatures in order to determine an estimated subframe configuration 310-*b*. The observed subframe configuration 305-*b* may include subframes that are unknown to be inside or outside of a DTXW (e.g., unknown subframes 315-*e* and 315-*g*). However, a UE may associate subframe 315-*f* with a first CRS signature, and subframe 315-*f* may also have the first CRS signature. Thus, the UE 115 may identify a set of estimated DTXW subframes 330. However, other subframes such as unknown subframe 320 may still be undetermined. Subsequent measurements may provide additional information and may enable a UE 115 to refine an estimated DTXW.

Figure 3C:
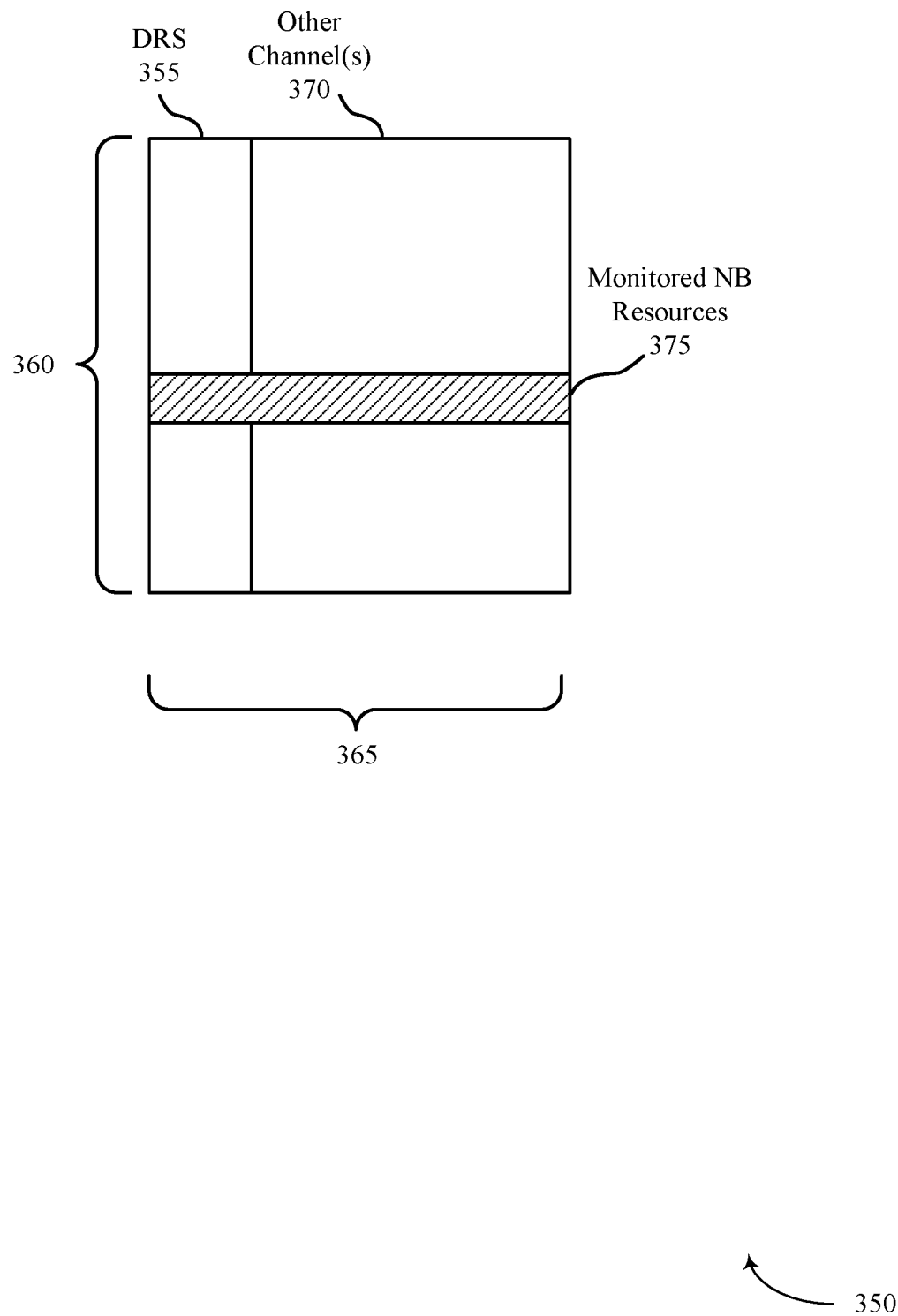
FIG. 3C illustrates DTXW resources and subsets of DTXW resources to support discovery signal measurement configuration in accordance with aspects of the present disclosure.

FIG. 3C illustrates DTXW resources 350 and subsets thereof to support discovery signal measurement configuration in accordance with aspects of the present disclosure. In some cases, DTXW resources 350 may represent aspects of techniques performed by a UE 115 or base station 105 as described with reference to FIGS. 1 and 2.

In the example of FIG. 3C, DTXW resources 350 may include resources within a DTXW 365, which may span a wideband bandwidth 360 of a shared radio frequency spectrum band. The DTXW resources 350 may include DRS 355 resources, and resources for one or more other channels 370 (e.g., PDCCH resources, PDSCH resources, reference signal resources, etc.) In some examples, as indicated above, a UE may monitor a subset of DTXW resources, such as a narrowband resources 375 and make a determination of DRS blocking based on the monitored narrowband resources 375. In other examples, the UE may monitor one or more resources of the other channels 370 and make a determination of DRS blocking based on one or more signals in the other channels 370 (e.g., the UE may decode a C-PDCCH transmission but miss the DRS 355 transmission, which may represent a DRS detection failure as opposed to DRS blocking that results from the base station failing to win the wireless medium). In some examples, the UE may determine one or more RLM parameters based at least in part on monitoring of a subset of the DTXW resources 350, and report the RLM parameters to the base station. In some examples, the reporting may include reporting a DRS detection failure based at least in part on a detection of one or more transmissions from the base station during the DTXW 365 and a failure to detect the DRS 355.

Figure 4A:
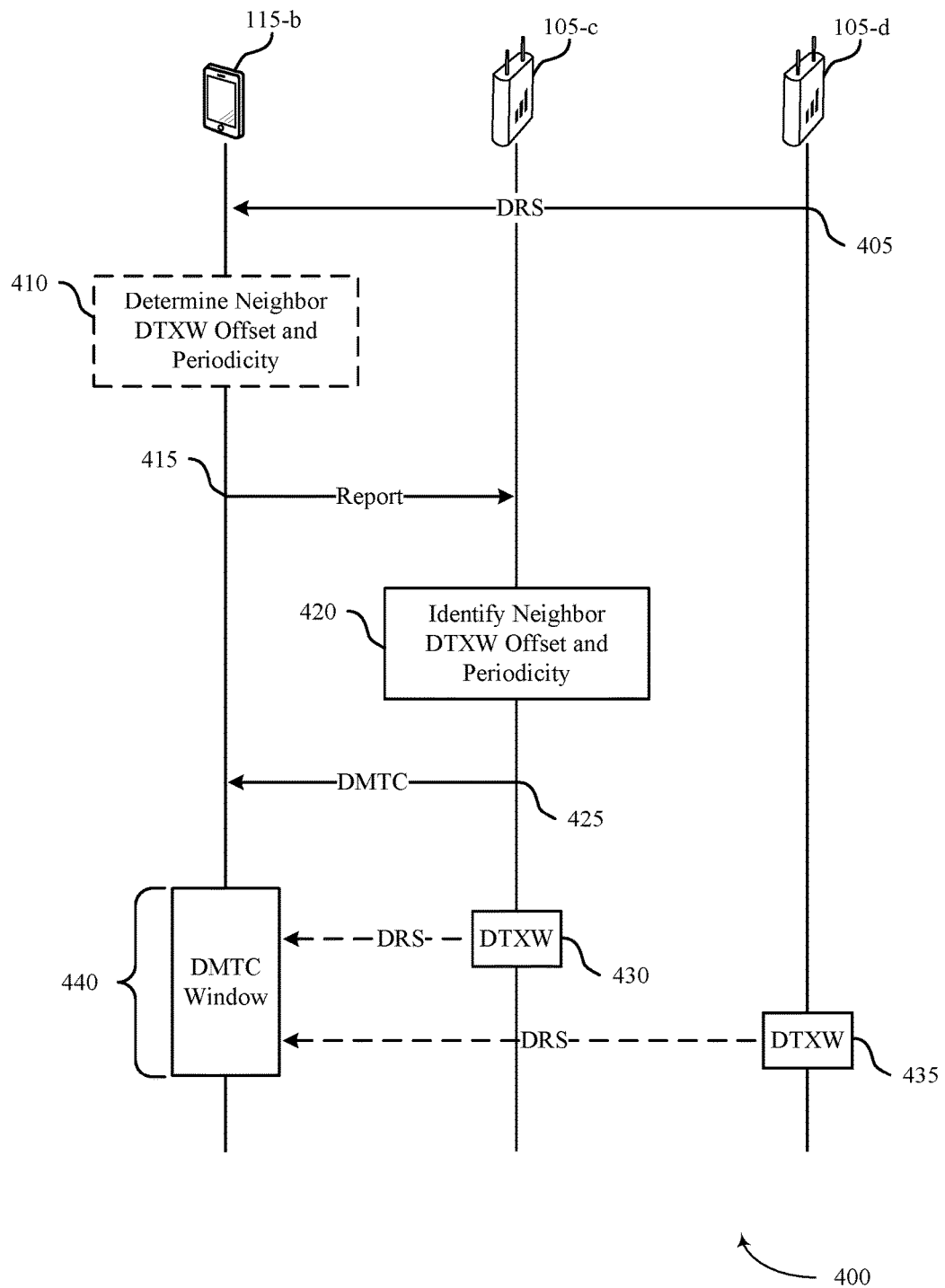
FIG. 4A illustrates an example of a process flow in a system that supports DTXW detection and discovery signal measurement configuration in accordance with aspects of the present disclosure.

FIG. 4A illustrates an example of a process flow 400 for DTXW detection and discovery signal measurement configuration in accordance with various aspects of the present disclosure. Process flow 400 may include base stations 105-*c* and 105-*d* in addition to UE 115-*b*, which may be examples of the corresponding devices described with reference to FIGS. 1 and 2.

At step 405, base station 105-*d* (e.g., a neighbor cell) may transmit a DRS that is measured by UE 115-*b*. The DTXW of the neighbor cell (e.g., base station 105-*d*) may be identified from the DRS or may be identified based on a signature of a PSS, SSS, or CRS. Further, neighbor cell DTXW may be identified based on a redundancy version of a PBCH transmission or based on a field of a MIB. In some cases, UE 115-*b* may be configured to perform measurements during subframes that use DRS-specific scrambling.

At step 410, UE 115-*b* may optionally determine neighbor DTXW parameters such as DTXW offset, periodicity, and length based on the DRS measurements of base station 105-*d*. At step 415, UE 115-*b* may report measurement results or DTXW parameters to base station 105-*c* (e.g., a serving cell).

Base station 105-*c* may determine the neighbor cell (e.g., base station 105-*d*) DTXW parameters at step 420. The DTXW parameters may either be signaled to base station 105-*c* as in step 415, or may be determined based on a received measurement report (e.g., of measurements of base station 105-*d*) from UE 115-*b*. That is, base station 105-*c* may identify a time stamp associated with a measurement report from UE 115-*b* and may determine neighbor cell (e.g., base station 105-*d*) DTXW parameters based on inferences from the time and the results of the measurement. For example, the estimated DTXW periodicity or estimated DTXW offset may be based on an interval where a maximum number of RSRP observations occur.

At step 425, base station 105-*c* may transmit a DMTC to UE 115-*b*. The DMTC may be based on the DTXW parameters of step 420. The DMTC may include a configuration for a connected mode of UE 115-*b* and/or may include a configuration for an idle mode of UE 115-*b*. UE 115-*b* may perform measurements on a neighbor cell while in idle mode based on the DMTC for idle mode. The DMTC may include parameters corresponding to one or more frequencies.

At step 430, base station 105-*c* may transmit DRS during a DTXW. The DTXW may partially or entirely overlap with a DMTC window of UE 115-*b*. At step 435, base station 105-*d* may transmit DRS during its own DTXW. The DTXW of base station 105-*d* may partially or entirely overlap with the DMTC window of UE 115-*b*. At step 440 UE 115-*b* may measure DRS from base station 105-*c* and/or base station 105-*d* within the DMTC window.

Figure 4B:
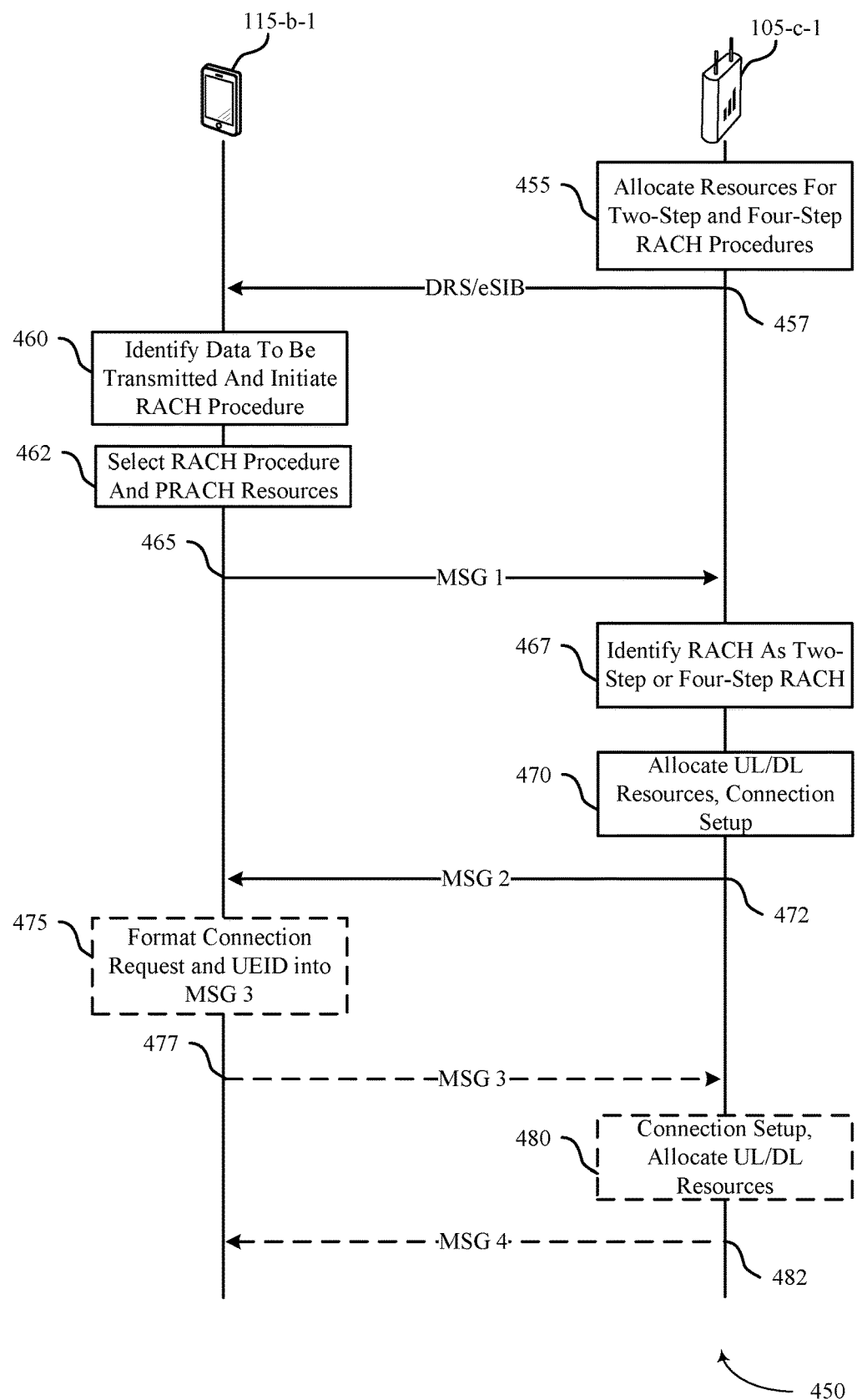
FIG. 4B illustrates an example of another process flow in a system that supports random access configuration in accordance with aspects of the present disclosure.

FIG. 4B illustrates an example of another process flow 450 in a system that supports random access configuration in accordance with aspects of the present disclosure. Process flow 450 may include base station 105-*c*-1 and UE 115-*b*-1, which may be examples of the corresponding devices described with reference to FIGS. 1, 2, and 4A.

At block 455, the base station 105-*c*-1 may allocate resources for two-step and four-step RACH procedures. Additionally, in some examples, the base station 105-*c*-1 may identify a first subset of random access resources for the two-step RACH procedure, and identify a second subset of random access resources for the four-step RACH procedure. The base station 105-*c*-1 may also, in some examples, configure one or more selection criteria for the UE 115-*b*-1 to select one of the first subset of random access resources or the second subset of random access resources. In some examples, the one or more selection criteria may include a channel quality threshold of a communications channel associated with the UE 115-b-1, and may include one or more configured thresholds for selecting the first subset of random access resources or the second subset of random access resources. In some examples, the first subset of random access resources comprise a first subset of interlaces of a set of random access resources, and the second subset of random access resources comprise a second subset of interlaces of the set of random access resources.

The base station 105-c-1 may transmit DRS/eSIB 457, which may include an indication of one or more of the first subset of random access resources, second subset of random access resources, or selection criteria.

The UE 115-b-1 may receive the DRS/eSIB 457 and identify the first subset of random access resources for the two-step RACH procedure and the second subset of random access resources for the a four-step RACH procedure. In some examples, the first subset of interlaces may be configured to allow sufficient payload capacity for a first RACH message of the two-step RACH process. At block 460, the UE 115-b-1 may identify data that is to be transmitted and initiate a RACH procedure. At block 462, the UE 115-b-1 may select a RACH procedure and one of the first subset of RACH resources or the second subset of RACH resources. Such a selection may be based on, for example, a channel metric of a communications channel of between the base station 105-c-1 and UE 115-b-1.

The UE 115-b-1 may transmit a random access MSG1 465 using the selected subset of resources. Based on the selected RACH procedure, MSG1 645 may include a random access request, UE ID, and an indication of data to be transmitted if the two-message RACH procedure is selected. Alternatively, MSG1 465 may simply include a random access request if the four-message RACH procedure is selected. At block 467, the base station 105-c-1 may identify the RACH request as a two-step or four-step RACH request. In some examples, the determination may be made based on the data included in the MSG1 465. In some examples, the determination may be made based on the resources used to transmit MSG1 465. For example, the first subset of RACH resources may include a first subset of interlaces of a set of RACH resources, and the second subset of RACH resources may include a second subset of interlaces of the set of RACH resources. The base station 105-c-1 may determine the RACH procedure based on the interlace(s) used for MSG1 465. At block 470, the base station 105-c-1 may allocate uplink and/or downlink resources and setup a connection. The base station 105-c-1 may transmit MSG2 472 to the UE 115-b-1, which may include uplink or downlink resources if the two-step RACH procedure is used, or may include a temporary UE ID and uplink resources for a third RACH message of the four-step RACH procedure is used.

At optional block 475, the UE 115-b-1 may format a connection request and UE ID into MSG 3, and may transmit MSG 3 477 to the base station 105-c-1 if the four-step RACH process is used. The base station 105-c-1 at block 480 may perform connection setup and allocate uplink and downlink resources to the UE 115-b-1 and transmit the information in MSG4 482 if the four-step RACH procedure is used. In some examples, a two-step RACH procedure may be advantageous due to the base station 105-c-1 and UE 115-b-1 having to perform fewer listen-before-talk (LBT) procedures. In some cases, the four-step RACH procedure may be advantageous due to less data being transmitted in the RACH resources and thus a higher likelihood of successful reception for situations where channel quality may be lower.

In some cases, the UE 115-b-1 may be allowed to decide between the two-step and four-step RACH procedure autonomously or semi-autonomously, based on configuration. For example, the decision may be based on metrics such as channel quality. The base station 105-c-1 may advertise (e.g., via eSIB) selection criteria, such as thresholds for one or more metrics, and the UE 115-b-1 may select the RACH procedure based on the selection criteria. In some examples, the two-step RACH procedure may use sPUCCH or enhanced PUCCH (ePUCCH) random access resources.

Figure 5:
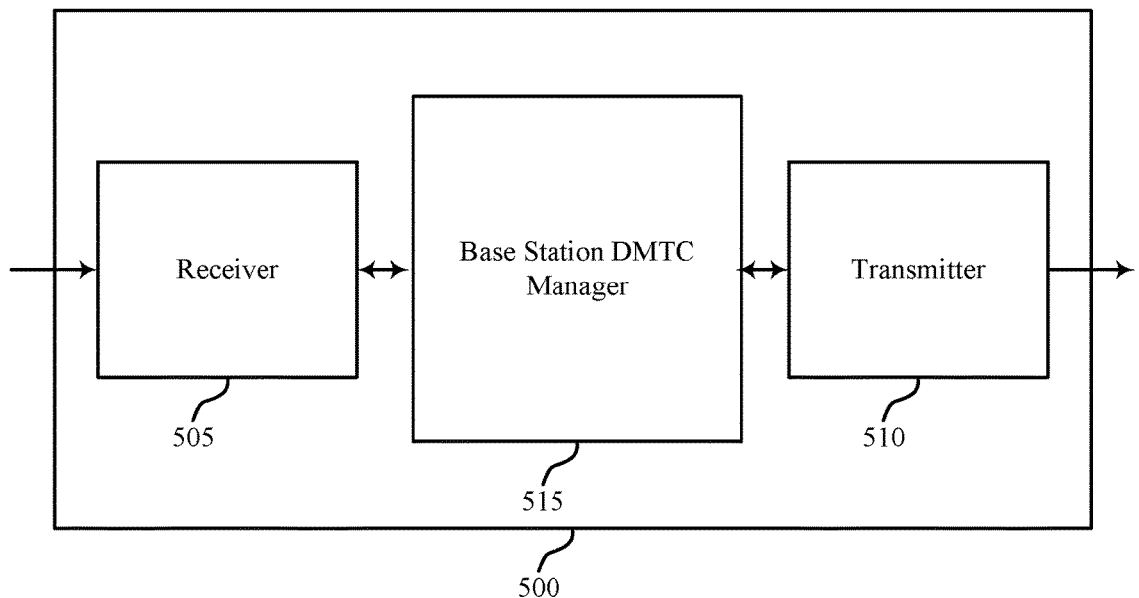
FIGS. 5 through 7 show block diagrams of a wireless device or devices that support DTXW detection and discovery signal measurement configuration in accordance with aspects of the present disclosure.

FIG. 5 shows a block diagram of a wireless device 500 that supports DTXW detection and discovery signal measurement configuration in accordance with various aspects of the present disclosure. Wireless device 500 may be an example of aspects of a base station 105 described with reference to FIGS. 1, 2, 4A, and 4B. Wireless device 500 may include receiver 505, transmitter 510 and base station DMTC manager 515. Wireless device 500 may also include a processor. Each of these components may be in communication with each other.

The receiver 505 may receive information such as packets, user data, or control information associated with various information channels (e.g., control channels, data channels, and information related to DTXW detection and discovery signal measurement configuration, etc.). Information may be passed on to other components of the device. The receiver 505 may be an example of aspects of the transceiver 825 described with reference to FIG. 8.

The transmitter 510 may transmit signals received from other components of wireless device 500. In some examples, the transmitter 510 may be collocated with a receiver in a transceiver module. For example, the transmitter 510 may be an example of aspects of the transceiver 825 described with reference to FIG. 8. The transmitter 510 may include a single antenna, or it may include a plurality of antennas.

The base station DMTC manager 515 may determine one or more parameters associated with a DTXW of a neighbor cell, and transmit a message that includes a DMTC to a UE, where the DMTC is based on the one or more parameters associated with the DTXW of the neighbor cell.

The base station DMTC manager 515 may also identify a DMTC for a UE, identify a paging frame based on the DMTC, and transmit a paging message to a UE 115 during the identified paging frame.

The base station DMTC manager 515 may also identify one or more parameters of a transmission opportunity, where the one or more parameters include an upcoming special subframe, an upcoming uplink subframe, the start and the duration of an upcoming uplink burst, or the total length of a transmission opportunity (TXOP), and transmit the one or more parameters in a broadcast message or in a C-PDCCH. The base station DMTC manager 515 may also be an example of aspects of the base station DMTC manager 805 described with reference to FIG. 8.

Figure 6:
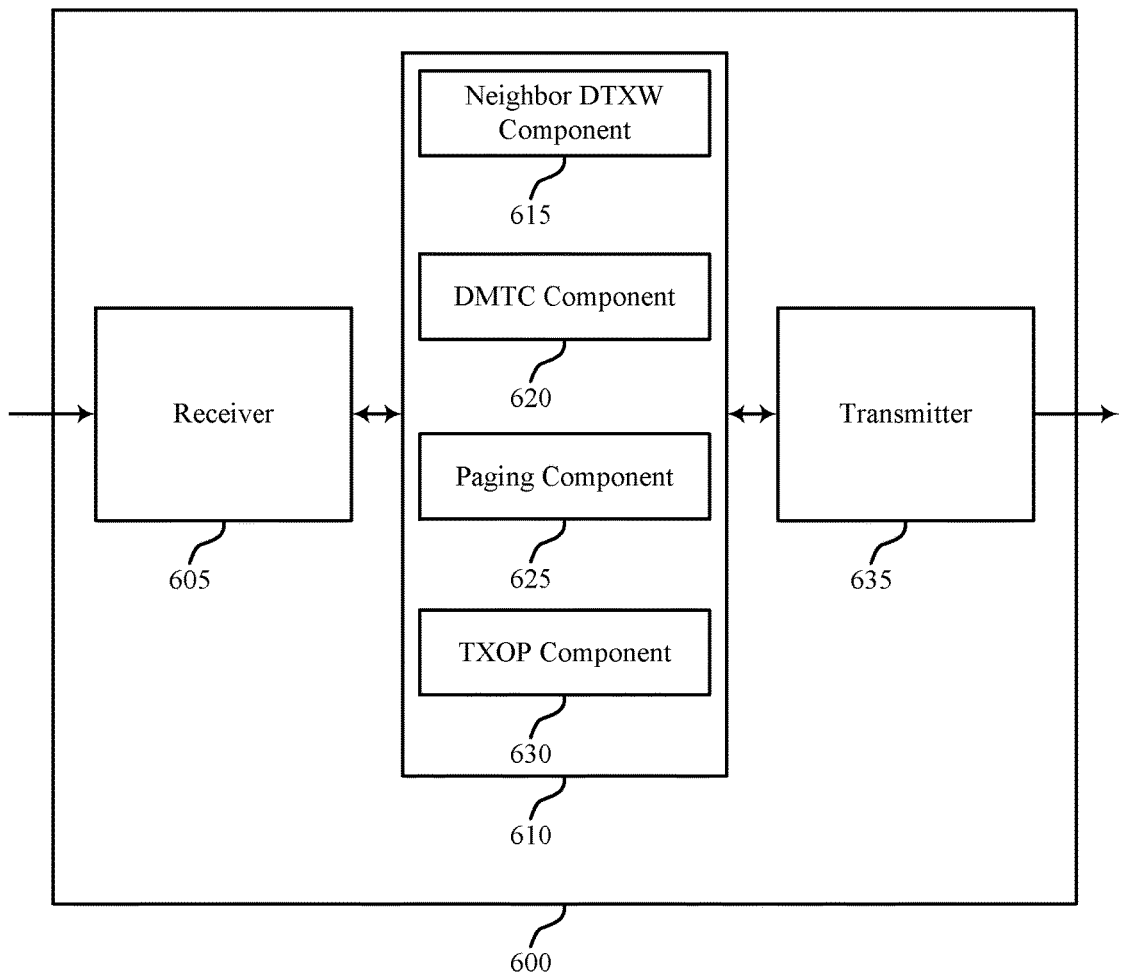

FIG. 6 shows a block diagram of a wireless device 600 that supports DTXW detection and discovery signal measurement configuration in accordance with various aspects of the present disclosure. Wireless device 600 may be an example of aspects of a wireless device 500 or a base station 105 described with reference to FIGS. 1, 2, 4A, 4B, and 5. Wireless device 600 may include receiver 605, base station DMTC manager 610 and transmitter 635. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The base station DMTC manager 610 may be an example of aspects of base station DMTC manager 515 described with reference to FIG. 5. The base station DMTC manager 610 may include neighbor DTXW component 615, DMTC component 620, paging component 625, and TXOP component 630. The base station DMTC manager 610 may be an example of aspects of the base station DMTC manager 805 described with reference to FIG. 8.

The neighbor DTXW component 615 may estimate a DTXW periodicity, a DTXW offset, or a DTXW length for the neighbor cell, and determine one or more parameters associated with a DTXW of a neighbor cell. In some cases, the one or more parameters associated with the DTXW include a DTXW offset parameter, a DTXW periodicity parameter, or a DTXW length parameter. In some cases, the estimated DTXW periodicity, the estimated DTXW offset, or the DTXW length is based on an interval including a maximum number of RSRP observations.

The DMTC component 620 may configure a UE 115 to perform a measurement of the neighbor cell based on the DTXW periodicity, the DTXW offset, or the DTXW length, where the measurement report is based on the measurement, transmit a subsequent message including a subsequent DMTC based on the one or more stored parameters, identify a DMTC for a UE, and transmit a message that includes a DMTC to a UE, where the DMTC is based on the one or more parameters associated with the DTXW of the neighbor cell.

In some cases, configuring the UE 115 to perform the measurement includes configuring the UE 115 to perform the measurement for subframes that use DRS specific scrambling. In some cases, a periodicity of the DMTC is an integer multiple or an integer divisor of a periodicity of a DTXW, or where an on duration or an offset of the DMTC are configured to include at least a portion of the DTXW. In some cases, the DMTC includes a set of parameters corresponding to a set of frequencies. In some cases, the DMTC includes a configuration for a connected mode of the UE 115. In some cases, the DMTC includes a configuration for an idle mode of the UE 115.

The paging component 625 may identify a paging frame based on the DMTC, transmit a paging message to a UE 115 during the identified paging frame, determine a number of paging frames (where the number of paging frames is scaled by a number of candidate paging frames that overlap with frames associated with the DMTC, and where the paging frame is identified based on the number of paging frames), and determine a number of paging opportunities in the paging frame based on the DMTC.

The TXOP component 630 may identify one or more parameters of a transmission opportunity, where the one or more parameters include an upcoming special subframe, an upcoming uplink subframe, the start and the duration of an upcoming uplink burst, or the total length of a transmission opportunity, and transmit the one or more parameters in a broadcast message or in a C-PDCCH.

The transmitter 635 may transmit signals received from other components of wireless device 600. In some examples, the transmitter 635 may be collocated with a receiver in a transceiver module. For example, the transmitter 635 may be an example of aspects of the transceiver 825 described with reference to FIG. 8. The transmitter 635 may utilize a single antenna, or it may utilize a plurality of antennas.

Figure 7:
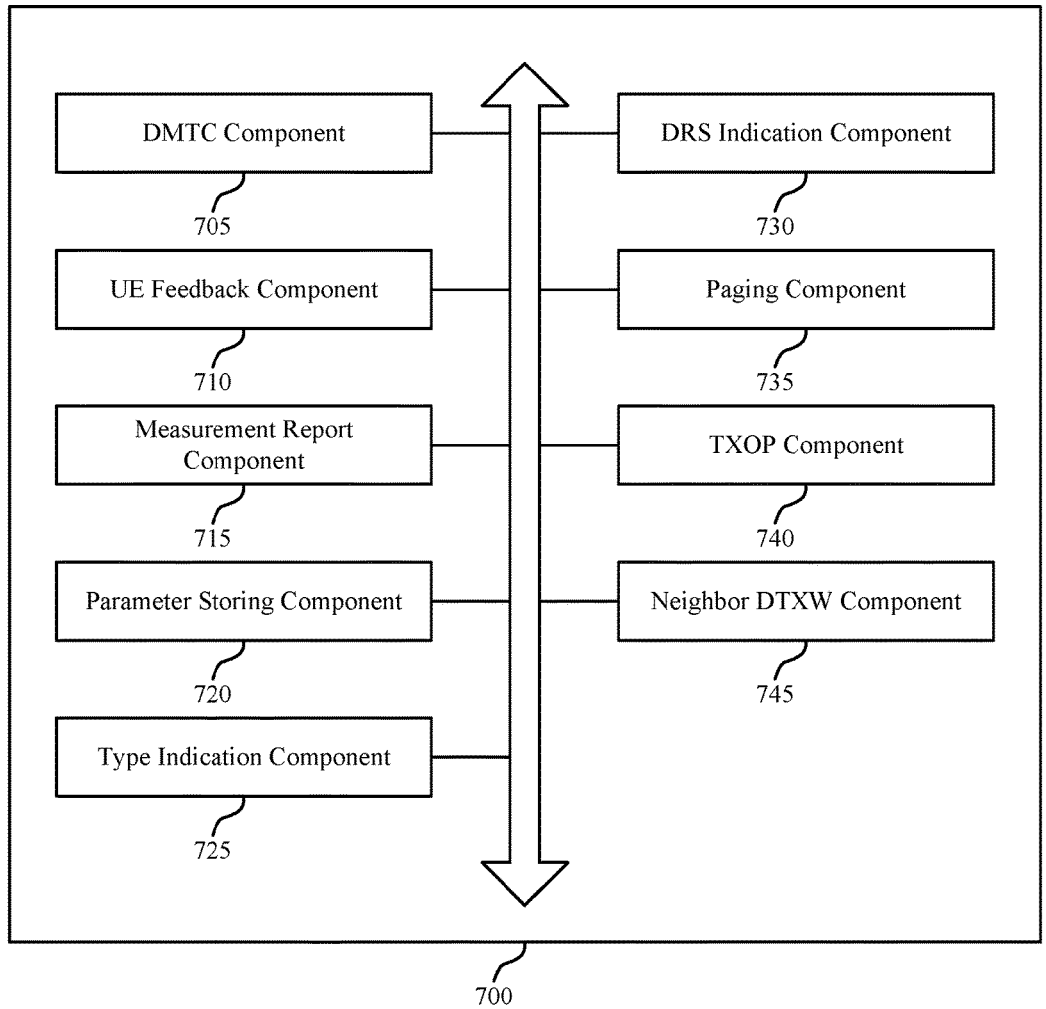

FIG. 7 shows a block diagram of a base station DMTC manager 700 which may be an example of the corresponding component of wireless device 500 or wireless device 600. That is, base station DMTC manager 700 may be an example of aspects of base station DMTC manager 515 or base station DMTC manager 610 described with reference to FIGS. 5 and 6. The base station DMTC manager 700 may also be an example of aspects of the base station DMTC manager 805 described with reference to FIG. 8.

The base station DMTC manager 700 may include DMTC component 705, UE feedback component 710, measurement report component 715, parameter storing component 720, type indication component 725, DRS indication component 730, paging component 735, TXOP component 740 and neighbor DTXW component 745. Each of these modules may communicate, directly or indirectly, with one another (e.g., via one or more buses).

The DMTC component 705 may configure the UE 115 to perform a measurement of the neighbor cell based on the DTXW periodicity, the DTXW offset, or the DTXW length, where the measurement report is based on the measurement, transmit a subsequent message including a subsequent DMTC based on the one or more stored parameters, identify a DMTC for a UE, and transmit a message that includes a DMTC to a UE, where the DMTC is based on the one or more parameters associated with the DTXW of the neighbor cell.

The UE feedback component 710 may receive signaling from the UE 115 that indicates a UE estimate of the one or more parameters associated with the DTXW of the neighbor cell, where the UE estimate is associated with a cell or a frequency, and where the one or more parameters are determined based on the estimate.

The measurement report component 715 may receive a measurement report from the UE, where the one or more parameters associated with the DTXW of the neighbor cell are determined based on the measurement report, and identify a time stamp of the measurement report, where the one or more parameters associated with the DTXW of the neighbor cell are determined based on the time stamp of the measurement report.

The parameter storing component 720 may store the one or more parameters associated with the DTXW of the neighbor cell. The type indication component 725 may transmit an indication of a subframe type in a field of an eSIB or a C-PDCCH message, where the subframe type includes an MBSFN type or a non-MBSFN type, and transmit an indication of a subframe type in UE specific layer 1 signaling.

The DRS indication component 730 may transmit a DRS indication for a subsequent subframe, transmit a DRS indication for a subsequent subframe, and transmit of a control region restriction for a subsequent DRS.

The paging component 735 may identify a paging frame based on the DMTC, transmit a paging message to a UE 115 during the identified paging frame, determine a number of paging frames, and determine a number of paging opportunities in the paging frame based on the DMTC.

The TXOP component 740 may identify one or more parameters of a transmission opportunity, where the one or more parameters include an upcoming special subframe, an upcoming uplink subframe, the start and the duration of an upcoming uplink burst, or the total length of a transmission opportunity, and transmit the one or more parameters in a broadcast message or in a C-PDCCH.

The neighbor DTXW component 745 may estimate a DTXW periodicity, a DTXW offset, or a DTXW length for the neighbor cell, and determine one or more parameters associated with a DTXW of a neighbor cell.

Figure 8:
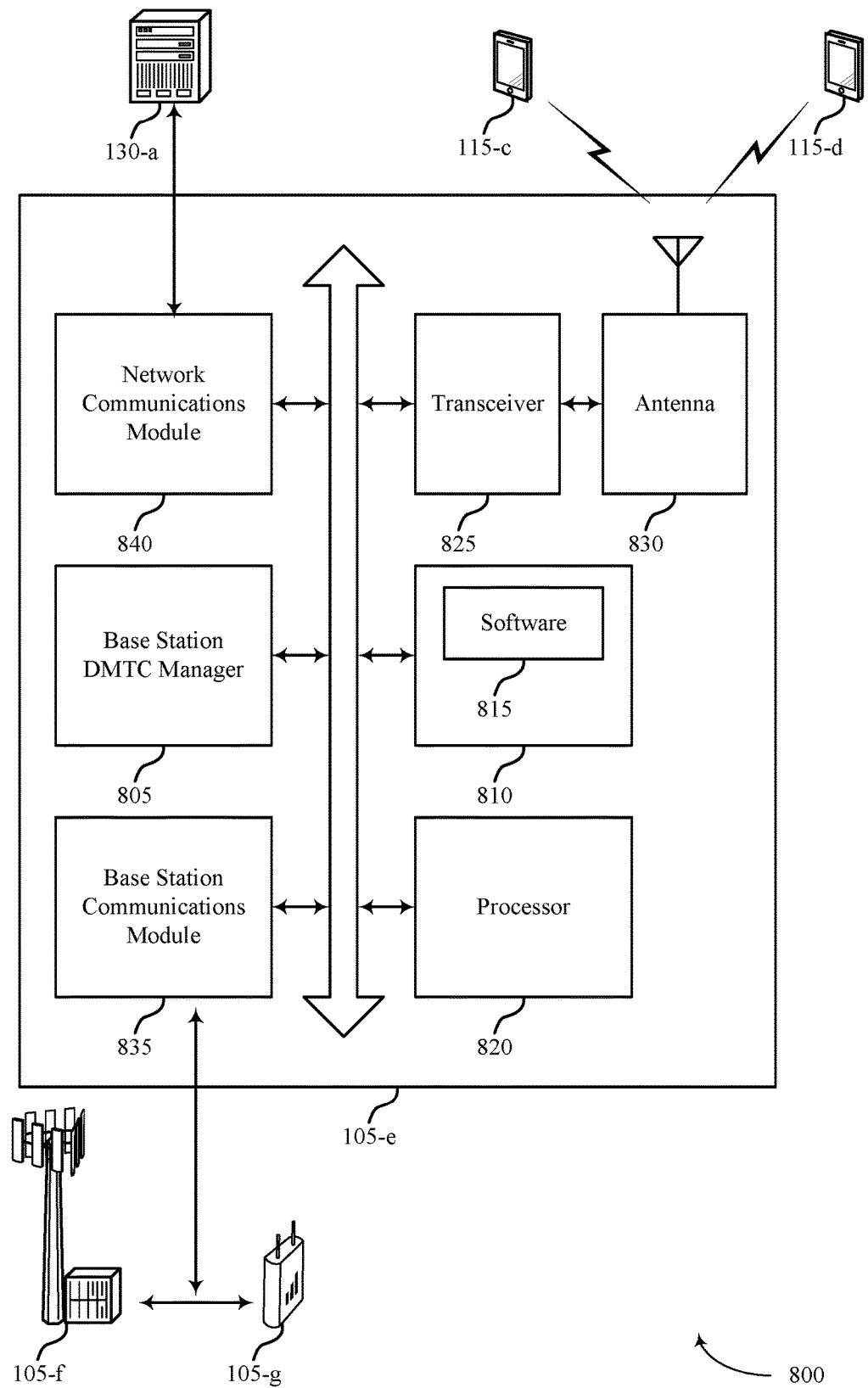
FIG. 8 illustrates a block diagram of a system including a base station that supports DTXW detection and discovery signal measurement configuration in accordance with aspects of the present disclosure.

FIG. 8 shows a diagram of a wireless system 800 including a device configured that supports DTXW detection and discovery signal measurement configuration in accordance with various aspects of the present disclosure. For example, system 800 may include base station 105-*e*, which may be an example of a wireless device 500, a wireless device 600, or a base station 105 as described with reference to FIGS. 1, 2, 4A, 4B, and 5 through 7. Base station 105-*e* may also include components for bi-directional voice and data communications including components for transmitting communications and components for receiving communications. For example, base station 105-*e* may communicate bi-directionally with one or more UEs 115 (e.g., UE 115-*c* and UE 115-*d*).

Base station 105-*e* may also include base station DMTC manager 805, memory 810, processor 820, transceiver 825, antenna 830, base station communications module 835 and network communications module 840. Each of these modules may communicate, directly or indirectly, with one another (e.g., via one or more buses). The base station DMTC manager 805 may be an example of a base station DMTC manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., DTXW detection and discovery signal measurement configuration, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.).

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

The base station communications module 835 may manage communications with other base station 105, and may include a controller or scheduler for controlling communications with UEs 115 in cooperation with other base stations 105. For example, the base station communications module 835 may coordinate scheduling for transmissions to UEs 115 for various interference mitigation techniques such as beamforming or joint transmission. In some examples, base station communications module 835 may provide an X2 interface within an LTE/LTE-A wireless communication network technology to provide communication between base stations 105.

The network communications module 840 may manage communications with the core network 130-*a* (e.g., via one or more wired backhaul links). For example, the network communications module 840 may manage the transfer of data communications for client devices, such as one or more UEs 115.

Figure 9:
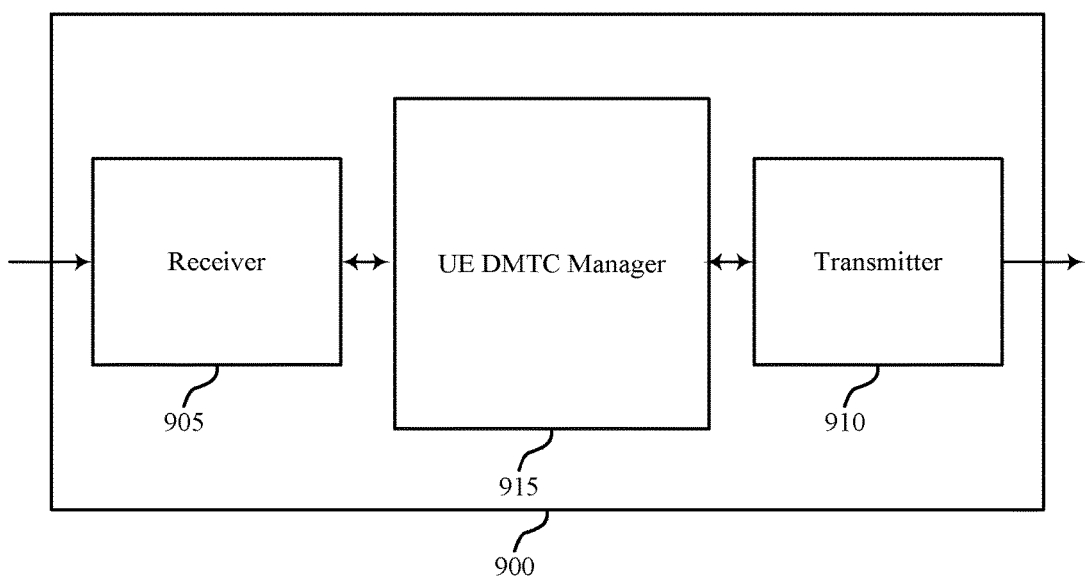
FIGS. 9 through 11 show block diagrams of a wireless device or devices that support DTXW detection and discovery signal measurement configuration in accordance with aspects of the present disclosure.

FIG. 9 shows a block diagram of a wireless device 900 that supports DTXW detection and discovery signal measurement configuration in accordance with various aspects of the present disclosure. Wireless device 900 may be an example of aspects of a UE 115 described with reference to FIGS. 1, 2, 4A, and 4B. Wireless device 900 may include receiver 905, transmitter 910, and UE DMTC manager 915. Wireless device 900 may also include a processor. Each of these components may be in communication with each other.

The receiver 905 may receive information such as packets, user data, or control information associated with various information channels (e.g., control channels, data channels, and information related to DTXW detection and discovery signal measurement configuration, etc.). Information may be passed on to other components of the device. The receiver 905 may be an example of aspects of the transceiver 1225 described with reference to FIG. 12.

The transmitter 910 may transmit signals received from other components of wireless device 900. In some examples, the transmitter 910 may be collocated with a receiver in a transceiver module. For example, the transmitter 910 may be an example of aspects of the transceiver 1225 described with reference to FIG. 12. The transmitter 910 may include a single antenna, or it may include a plurality of antennas.

The UE DMTC manager 915 may transmit an indication of one or more parameters associated with a DTXW of a neighbor cell, and receive a message including a DMTC that is based on the one or more parameters. The UE DMTC manager 915 may also identify a DMTC for idle mode operation, monitor a paging channel during an on duration of the DMTC, and receive a paging message based on the monitoring. The UE DMTC manager 915 may also receive a message using a broadcast channel or a PDCCH, and identify one or more parameters of a transmission opportunity based on the received message, where the one or more parameters include an upcoming special subframe, an upcoming uplink subframe, the start and the duration of an upcoming uplink burst, or the total length of a transmission opportunity. The UE DMTC manager 915 may also be an example of aspects of the UE DMTC manager 1205 described with reference to FIG. 12.

Figure 10:
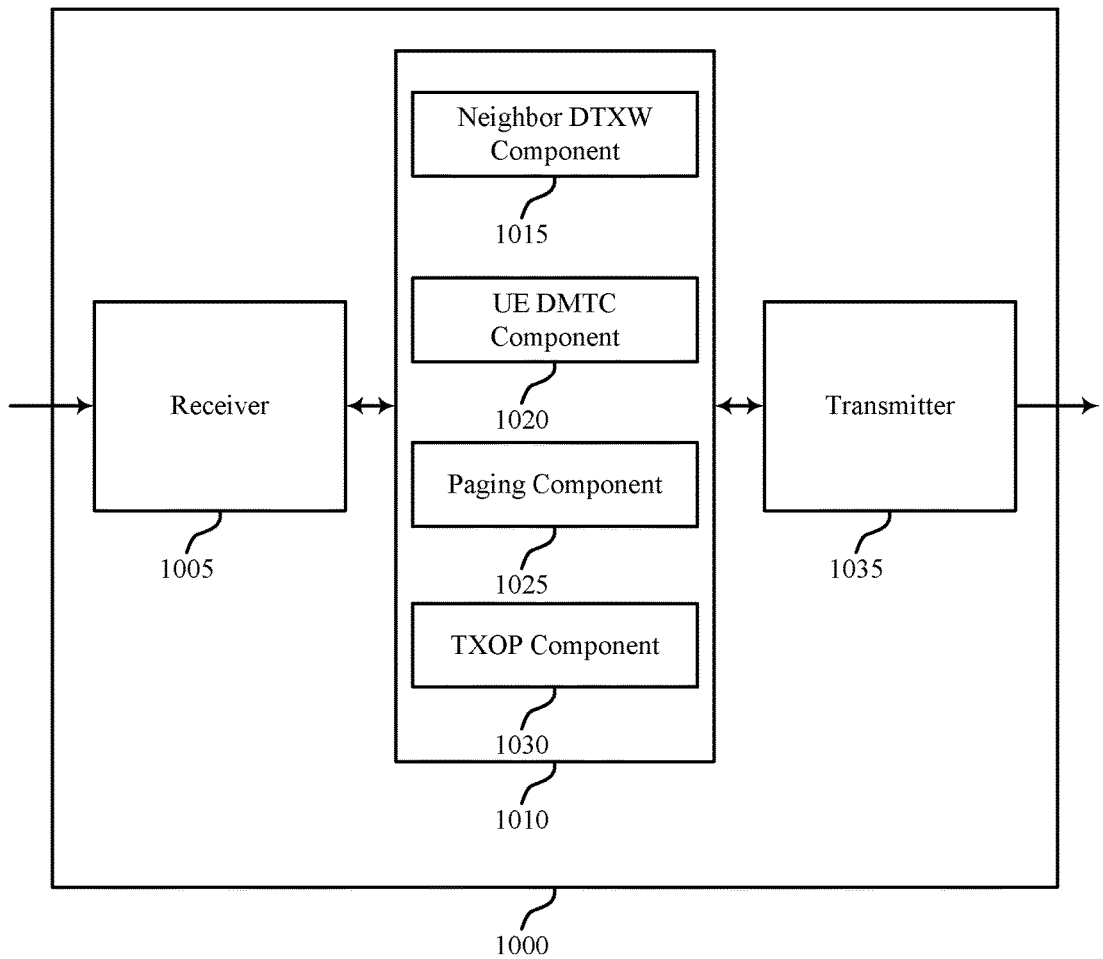

FIG. 10 shows a block diagram of a wireless device 1000 that supports DTXW detection and discovery signal measurement configuration in accordance with various aspects of the present disclosure. Wireless device 1000 may be an example of aspects of a wireless device 900 or a UE 115 described with reference to FIGS. 1, 2, 4A, 4B, and 9. Wireless device 1000 may include receiver 1005, UE DMTC manager 1010 and transmitter 1035. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The UE DMTC manager 1010 may be an example of aspects of UE DMTC manager 915 described with reference to FIG. 9. The UE DMTC manager 1010 may include neighbor DTXW component 1015, UE DMTC component 1020, paging component 1025 and TXOP component 1030.

The UE DMTC manager 1010 may be an example of aspects of the UE DMTC manager 1205 described with reference to FIG. 12.

The neighbor DTXW component 1015 may transmit an indication of one or more parameters associated with a DTXW of a neighbor cell, identify a DRS of the neighbor cell, where the indication of the one or more parameters associated with the DTXW of the neighbor cell is based on the DRS, identify a DTXW of the neighbor cell based on the DRS, and identify a DTXW of the neighbor cell based on a system frame number where the DTXW occurs.

In some cases, the DTXW of the neighbor cell is identified based on a signature of a PSS, a SSS, or a CRS. In some cases, the DTXW of the neighbor cell is identified based on a redundancy version of a PBCH transmission. In some cases, the DTXW of the neighbor cell is identified based on a field of a MIB. In some cases, the one or more parameters associated with the DTXW of the neighbor cell include a DTXW offset parameter, a DTXW periodicity parameter, or a DTXW length parameter. In some cases, the indication includes a time stamp of a measurement report.

The UE DMTC component 1020 may receive a message including a DMTC that is based on the one or more parameters, perform a measurement on the neighbor cell while in an idle mode based on the DMTC, monitor the neighbor cell or a serving cell based on a connected mode configuration of the DMTC and the trigger condition, monitor the neighbor cell based on the trigger condition during a period outside of a DMTC interval associated with a connected mode configuration of the DMTC, monitor the neighbor cell for a DRS based on the DMTC, and identify a DMTC for idle mode operation.

In some cases, the DMTC includes a configuration for connected mode RRM measurements or RLM measurements. In some cases, a periodicity of the DMTC is an integer multiple or an integer divisor of a periodicity of a DTXW, or where an on duration or an offset of the DMTC are configured to include at least a portion of the DTXW.

The paging component 1025 may monitor a paging channel during an on duration of the DMTC receive a paging message based on the monitoring, and refrain from further monitoring the paging channel during a paging frame after observing the paging message in the assigned paging opportunity of the paging frame.

The TXOP component 1030 may receive a message using a broadcast channel or a C-PDCCH, identify one or more parameters of a transmission opportunity based on the received message, where the one or more parameters include an upcoming special subframe, an upcoming uplink subframe, the start and the duration of an upcoming uplink burst, or the total length of a transmission opportunity, and determine whether to perform an UL transmission corresponding to a previously provided UL grant based on the one or more parameters, where the UL transmission includes a PUSCH transmission, a PUCCH transmission, or a PRACH transmission.

The transmitter 1035 may transmit signals received from other components of wireless device 1000. In some examples, the transmitter 1035 may be collocated with a receiver in a transceiver module. For example, the transmitter 1035 may be an example of aspects of the transceiver 1225 described with reference to FIG. 12. The transmitter 1035 may utilize a single antenna, or it may utilize a plurality of antennas.

Figure 11:
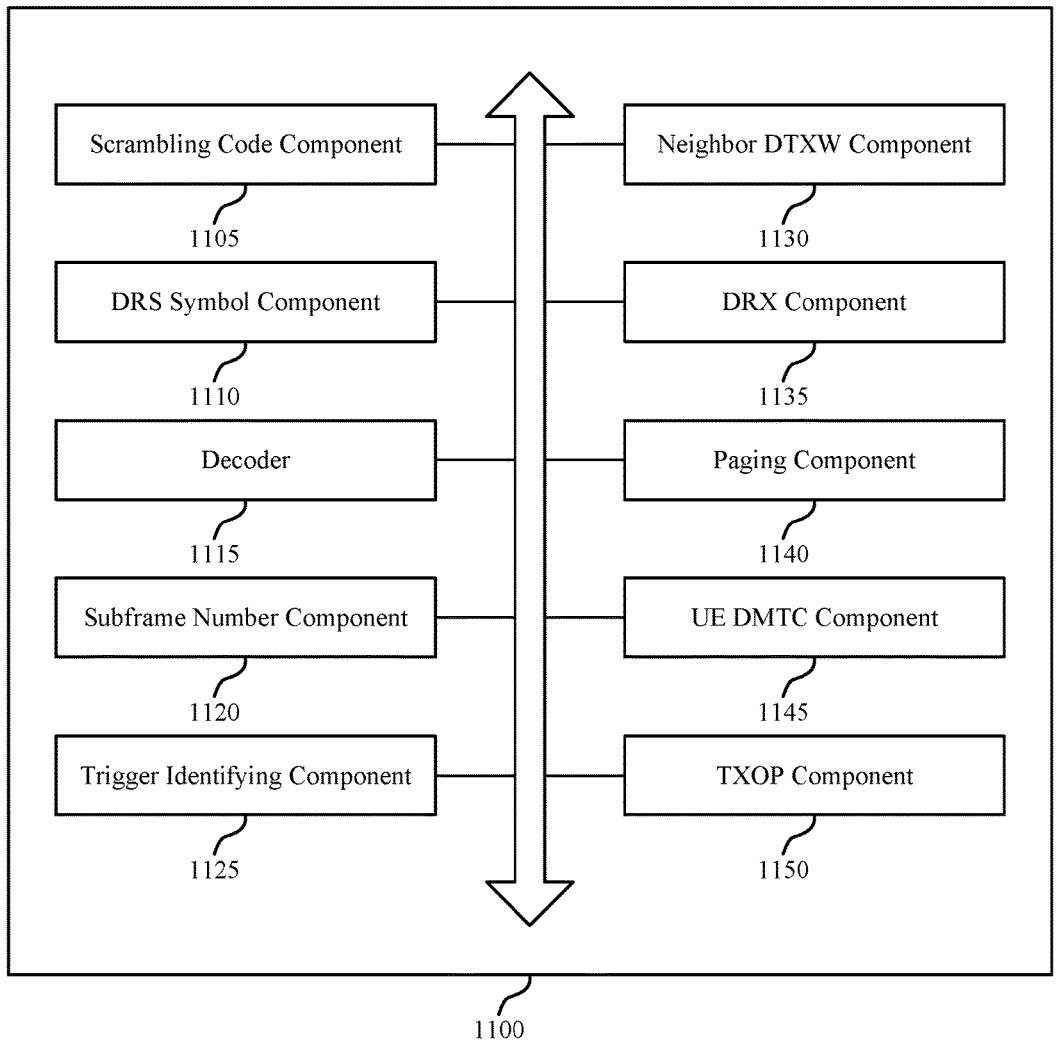

FIG. 11 shows a block diagram of a UE DMTC manager 1100 which may be an example of the corresponding component of wireless device 900 or wireless device 1000. That is, UE DMTC manager 1100 may be an example of aspects of UE DMTC manager 915 or UE DMTC manager 1010 described with reference to FIGS. 9 and 10. The UE DMTC manager 1100 may also be an example of aspects of the UE DMTC manager 1205 described with reference to FIG. 12.

The UE DMTC manager 1100 may include scrambling code component 1105, DRS symbol component 1110, decoder 1115, subframe number component 1120, trigger identifying component 1125, neighbor DTXW component 1130, DRX component 1135, paging component 1140, UE DMTC component 1145, and TXOP component 1150. Each of these modules may communicate, directly or indirectly, with one another (e.g., via one or more buses).

The scrambling code component 1105 may determine that a CRS scrambling code does not match an expected subframe index, where the expected subframe index is determined based on a time between a first subframe and a second subframe having known CRS scrambling code, or on an explicitly subframe index indication, identify subframe-specific scrambling information or search space information for paging control or data decoding based on the subframe number, and determine one or more scrambling codes of an eSIB using multiple hypothesis testing. In some cases, a scrambling code used for a PDSCH portion of an eSIB and a control channel search space for the eSIB are based on a subframe index. In some cases, a scrambling code used for a PDSCH portion of an eSIB or a control channel search space for the eSIB or for a paging channel are based on a scrambling code used by a CRS transmission during a same subframe as the PDSCH portion of the eSIB.

The DRS symbol component 1110 may identify a number of symbols that include a portion of the DRS. The subframe number component 1120 may determine a subframe number using PBCH decoding.

The decoder 1115 may decode an eSIB based on the number of symbols, decode an eSIB using a pre-determined number of symbols in the absence of an explicit indication of the pre-determined number of symbols, or decode the eSIB or a paging message based on the one or more scrambling codes.

The trigger identifying component 1125 may identify a trigger condition including a signal quality condition, a location of a UE, or an opportunistic measurement condition, and identify a trigger condition. In some cases, the trigger condition includes an explicit signal from a base station. In some cases, the trigger condition includes an identification of one or more handover conditions, or of a low signal level from a serving cell.

The neighbor DTXW component 1130 may transmit an indication of one or more parameters associated with a DTXW of a neighbor cell, identify a DRS of the neighbor cell, where the indication of the one or more parameters associated with the DTXW of the neighbor cell is based on the DRS, identify a DTXW of the neighbor cell based on the DRS, and identify a DTXW of the neighbor cell based on a system frame number where the DTXW occurs.

The DRX component 1135 may receive a connected mode discontinuous reception (C-DRX) configuration from the serving cell, identify an absence of a scheduling transmission from the serving cell during an on duration of the C-DRX configuration, and monitor the serving cell for the scheduling transmission during a DTXW of the serving cell following the on duration.

The paging component 1140 may monitor a paging channel during an on duration of the DMTC receive a paging message based on the monitoring, and refrain from further monitoring the paging channel during a paging frame after observing the paging message in the assigned paging opportunity of the paging frame.

The UE DMTC component 1145 may receive a message including a DMTC that is based on the one or more parameters, perform a measurement on the neighbor cell while in an idle mode based on the DMTC, monitor the neighbor cell or a serving cell based on a connected mode configuration of the DMTC and the trigger condition, monitor the neighbor cell based on the trigger condition during a period outside of a DMTC interval associated with a connected mode configuration of the DMTC, monitor the neighbor cell for a DRS based on the DMTC, and identify a DMTC for idle mode operation.

The TXOP component 1150 may receive a message using a broadcast channel or a C-PDCCH, identify one or more parameters of a transmission opportunity based on the received message, where the one or more parameters include an upcoming special subframe, an upcoming uplink subframe, the start and the duration of an upcoming uplink burst, or the total length of a transmission opportunity, and determine whether to perform an UL transmission corresponding to a previously provided UL grant based on the one or more parameters.

Figure 12:
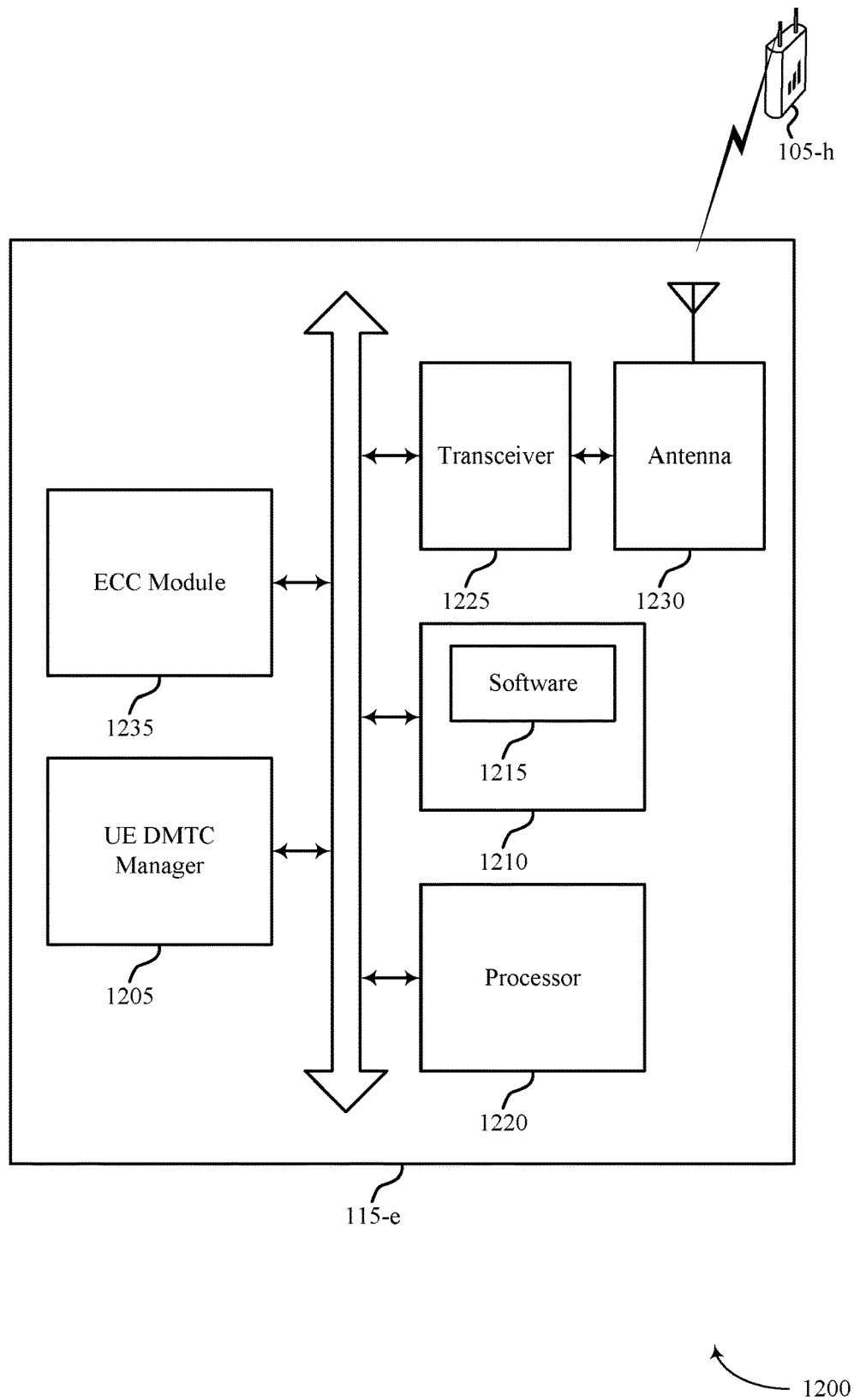
FIG. 12 illustrates a block diagram of a system including a UE that supports DTXW detection and discovery signal measurement configuration in accordance with aspects of the present disclosure.

FIG. 12 shows a diagram of a system 1200 including a device that supports DTXW detection and discovery signal measurement configuration in accordance with various aspects of the present disclosure. For example, system 1200 may include UE 115-*e*, which may be an example of a wireless device 900, a wireless device 1000, or a UE 115 as described with reference to FIGS. 1, 2, 4A, 4B, and 9 through 11.

UE 115-*e* may also include UE DMTC manager 1205, memory 1210, processor 1220, transceiver 1225, antenna 1230, and ECC module 1235. Each of these modules may communicate, directly or indirectly, with one another (e.g., via one or more buses). The UE DMTC manager 1205 may be an example of a UE DMTC manager as described with reference to FIGS. 9 through 11.

The memory 1210 may include RAM and ROM. The memory 1210 may store computer-readable, computer-executable software including instructions that, when executed, cause the processor to perform various functions described herein (e.g., DTXW detection and discovery signal measurement configuration, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas.

In some cases, the wireless device may include a single antenna 1230. However, in some cases the device may have more than one antenna 1230, which may be capable of concurrently transmitting or receiving multiple wireless transmissions.

ECC module 1235 may enable operations using eCCs as described above with reference to FIG. 1. For example ECC module 1235 may enable operations using unlicensed spectrum.

Figure 13:
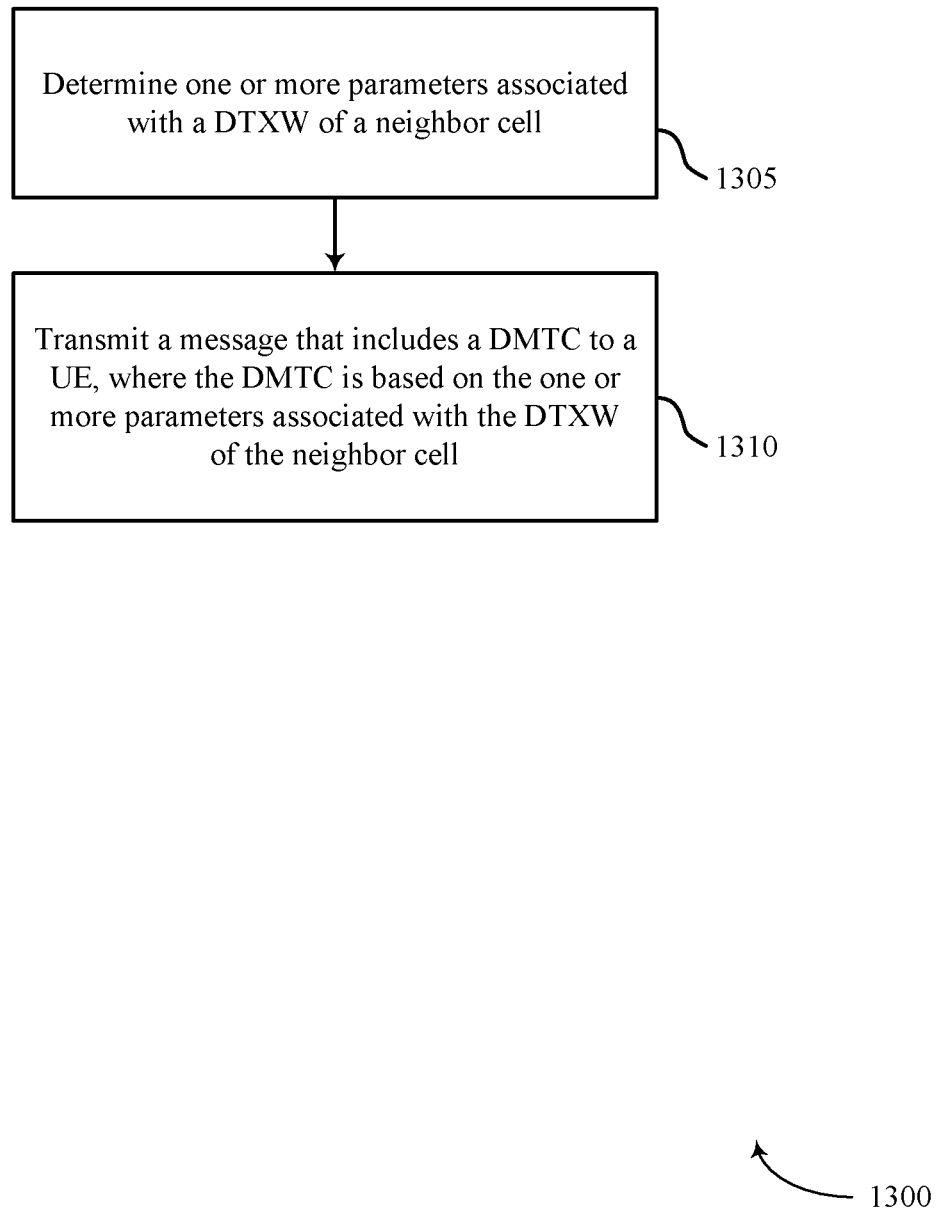
FIGS. 13 through 18 illustrate methods for DTXW detection and discovery signal measurement configuration in accordance with aspects of the present disclosure.

FIG. 13 shows a flowchart illustrating a method 1300 for DTXW detection and discovery signal measurement configuration in accordance with various aspects of the present disclosure. The operations of method 1300 may be implemented by a device such as a base station 105 or its components as described with reference to FIGS. 1, 2, 4A, 4B, and 5 through 8. For example, the operations of method 1300 may be performed by the base station DMTC manager as described herein. In some examples, the base station 105 may execute a set of codes to control the functional elements of the device to perform the functions described below. Additionally or alternatively, the base station 105 may perform aspects of the functions described below using special-purpose hardware.

At block 1305, the base station 105 may determine one or more parameters associated with a DTXW of a neighbor cell as described above with reference to FIGS. 2 through 4. In certain examples, the operations of block 1305 may be performed by the neighbor DTXW component as described with reference to FIGS. 6 and 7.

At block 1310, the base station 105 may transmit a message that includes a DMTC to a UE 115, where the DMTC is based on the one or more parameters associated with the DTXW of the neighbor cell as described above with reference to FIGS. 2 through 4. In certain examples, the operations of block 1310 may be performed by the DMTC component as described with reference to FIGS. 6 and 7.

Figure 14:
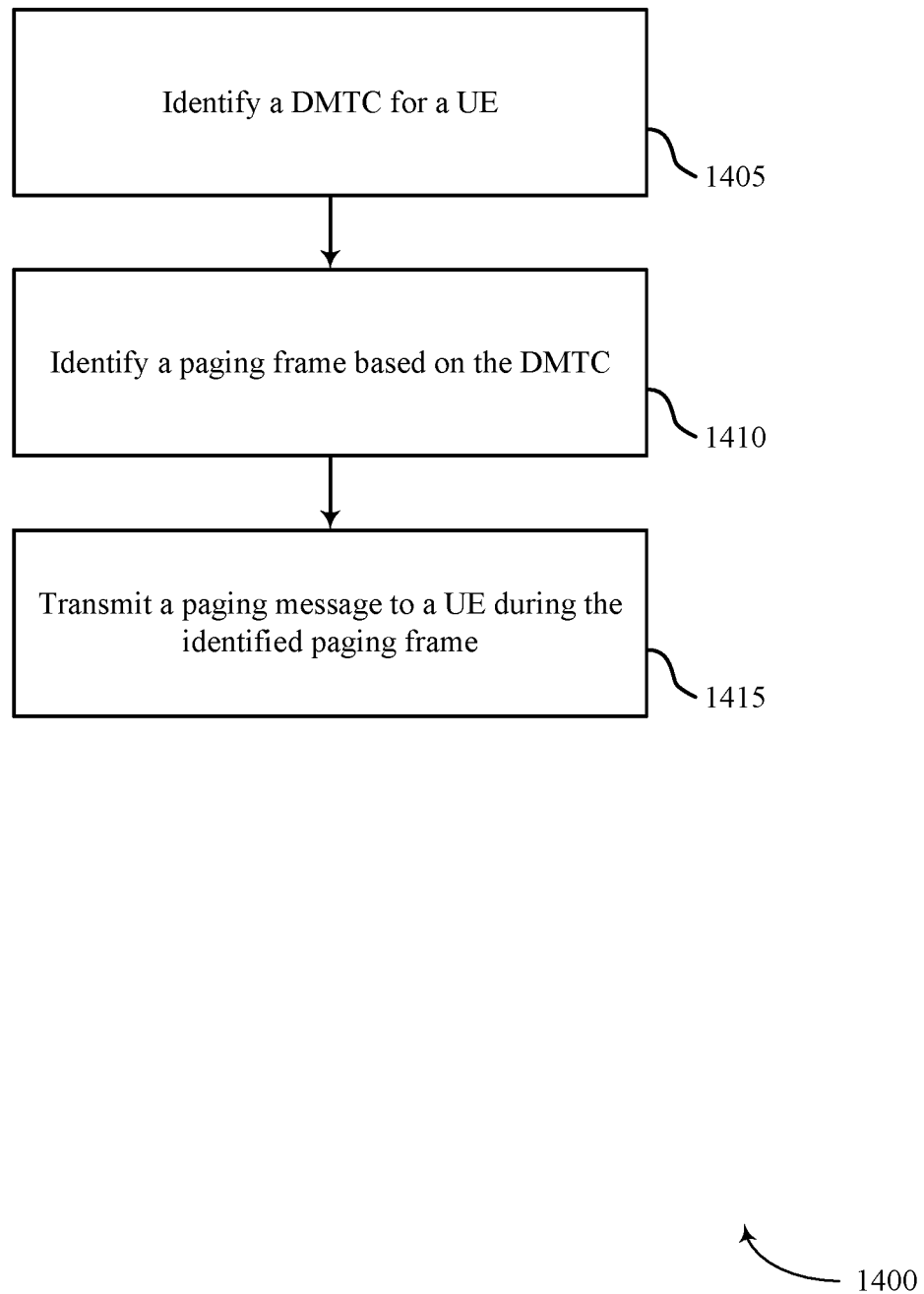

FIG. 14 shows a flowchart illustrating a method 1400 for DTXW detection and discovery signal measurement configuration in accordance with various aspects of the present disclosure. The operations of method 1400 may be implemented by a device such as a base station 105 or its components as described with reference to FIGS. 1, 2, 4A, 4B, and 5 through 8. For example, the operations of method 1400 may be performed by the base station DMTC manager as described herein. In some examples, the base station 105 may execute a set of codes to control the functional elements of the device to perform the functions described below. Additionally or alternatively, the base station 105 may perform aspects of the functions described below using special-purpose hardware.

At block 1405, the base station 105 may identify a DMTC for a UE 115 as described above with reference to FIGS. 2 through 4. In certain examples, the operations of block 1405 may be performed by the DMTC component as described with reference to FIGS. 6 and 7.

At block 1410, the base station 105 may identify a paging frame based on the DMTC as described above with reference to FIGS. 2 through 4. In certain examples, the operations of block 1410 may be performed by the paging component as described with reference to FIGS. 6 and 7.

At block 1415, the base station 105 may transmit a paging message to a UE 115 during the identified paging frame as described above with reference to FIGS. 2 through 4. In certain examples, the operations of block 1415 may be performed by the paging component as described with reference to FIGS. 6 and 7.

Figure 15:
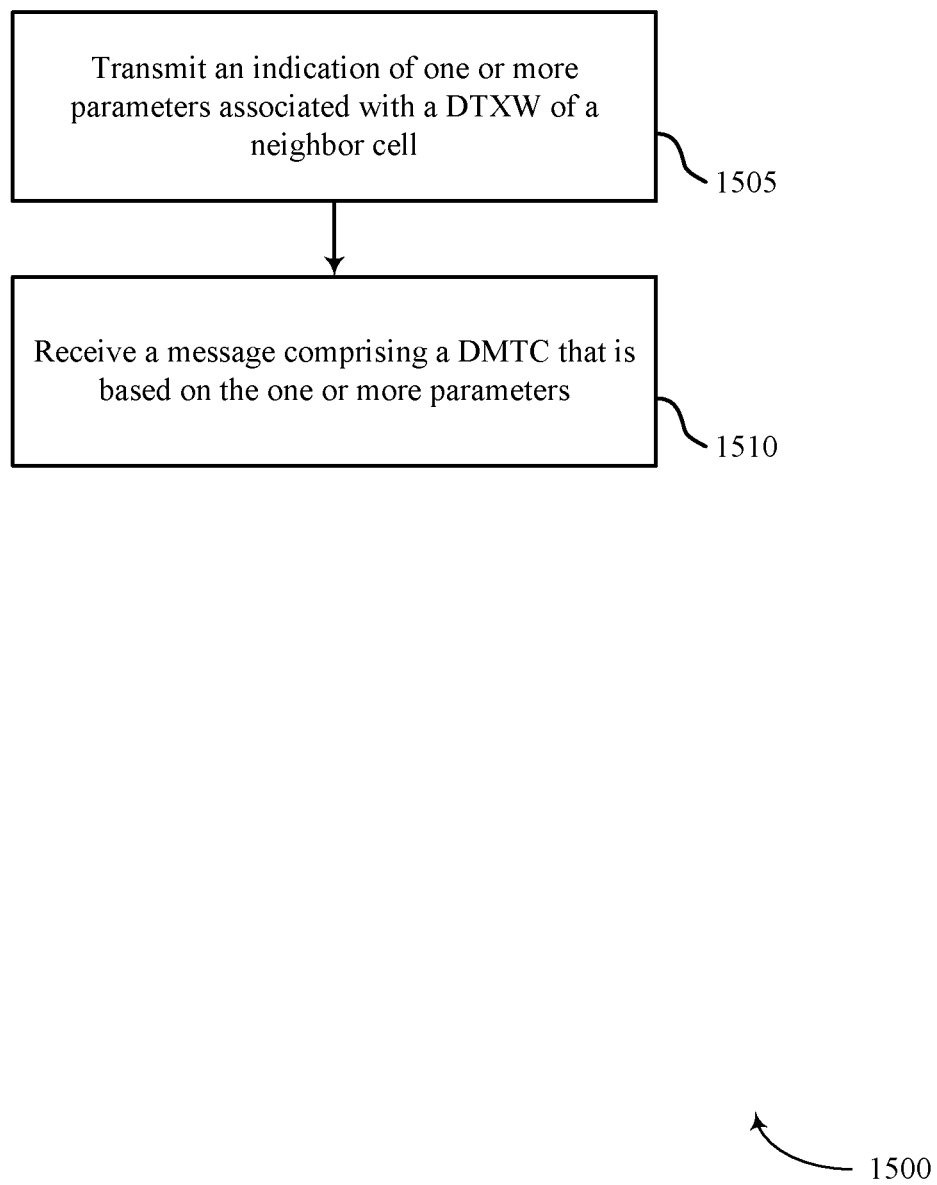

FIG. 15 shows a flowchart illustrating a method 1500 for DTXW detection and discovery signal measurement configuration in accordance with various aspects of the present disclosure. The operations of method 1500 may be implemented by a device such as a UE 115 or its components as described with reference to FIGS. 1, 2, 4A, 4B, and 9 through 12. For example, the operations of method 1500 may be performed by the UE DMTC manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may transmit an indication of one or more parameters associated with a DTXW of a neighbor cell as described above with reference to FIGS. 2 through 4. In certain examples, the operations of block 1505 may be performed by the neighbor DTXW component as described with reference to FIGS. 10 and 11.

At block 1510, the UE 115 may receive a message including a DMTC that is based on the one or more parameters as described above with reference to FIGS. 2 through 4. In certain examples, the operations of block 1510 may be performed by the UE DMTC component as described with reference to FIGS. 10 and 11.

Figure 16:
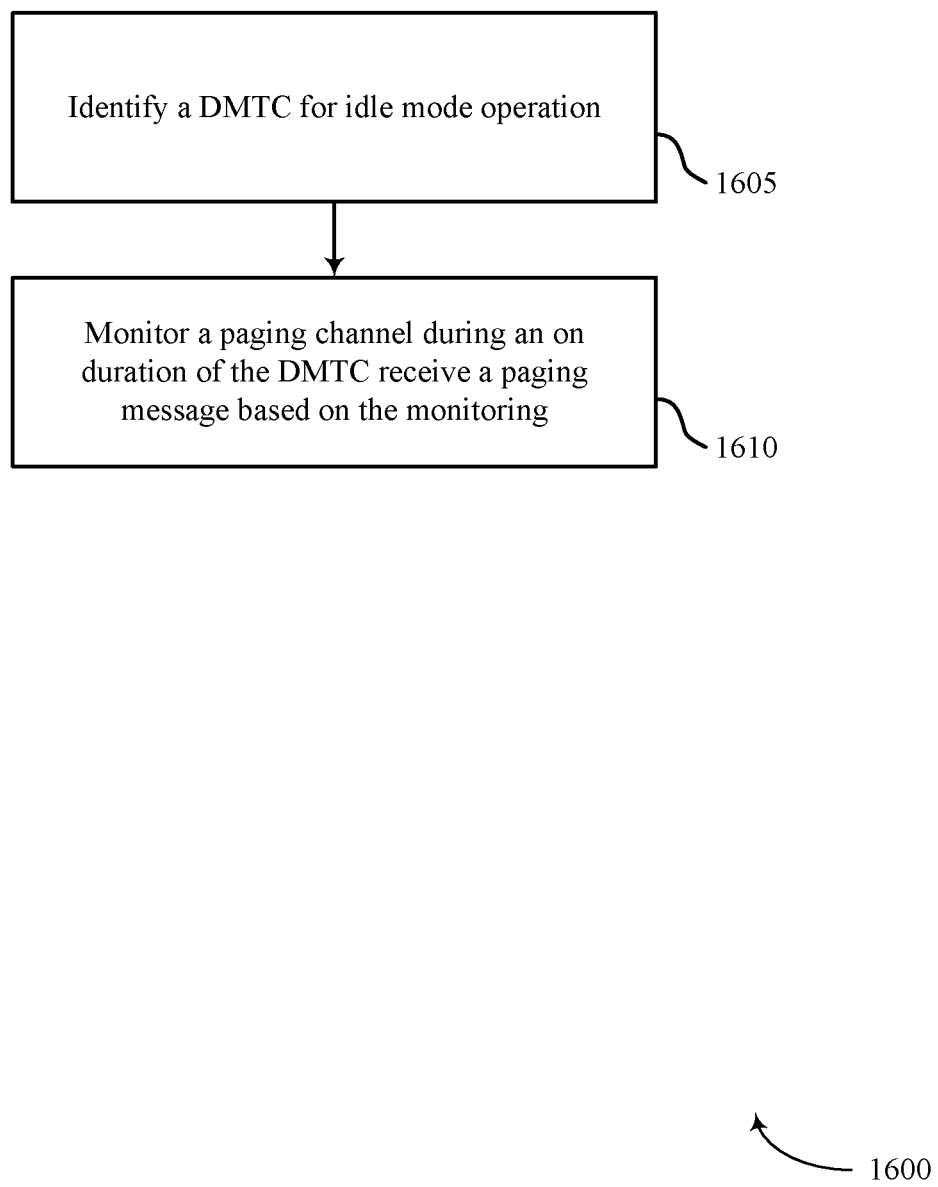

FIG. 16 shows a flowchart illustrating a method 1600 for DTXW detection and discovery signal measurement configuration in accordance with various aspects of the present disclosure. The operations of method 1600 may be implemented by a device such as a UE 115 or its components as described with reference to FIGS. 1, 2, 4A, 4B, and 9 through 12. For example, the operations of method 1600 may be performed by the UE DMTC manager as described herein. In some examples, the UE 115 may execute a set of codes to control the functional elements of the device to perform the functions described below. Additionally or alternatively, the UE 115 may perform aspects of the functions described below using special-purpose hardware.

At block 1605, the UE 115 may identify a DMTC for idle mode operation as described above with reference to FIGS. 2 through 4. In certain examples, the operations of block 1605 may be performed by the UE DMTC component as described with reference to FIGS. 10 and 11.

At block 1610, the UE 115 may monitor a paging channel during an on duration of the DMTC receive a paging message based on the monitoring as described above with reference to FIGS. 2 through 4. In certain examples, the operations of block 1610 may be performed by the paging component as described with reference to FIGS. 10 and 11.

Figure 17:
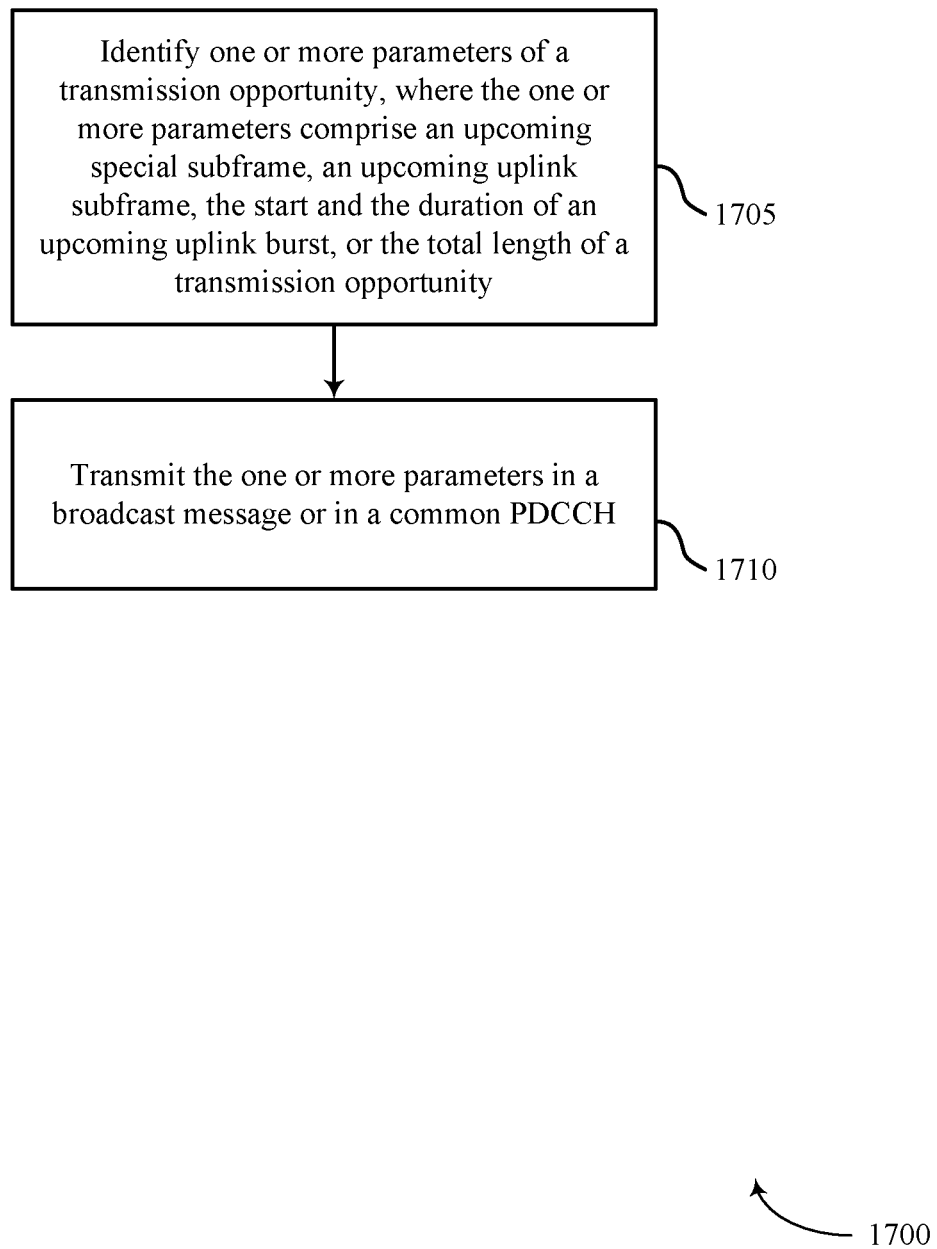

FIG. 17 shows a flowchart illustrating a method 1700 for DTXW detection and discovery signal measurement configuration in accordance with various aspects of the present disclosure. The operations of method 1700 may be implemented by a device such as a base station 105 or its components as described with reference to FIGS. 1, 2, 4A, 4B, and 5 through 8. For example, the operations of method 1700 may be performed by the base station DMTC manager as described herein. In some examples, the base station 105 may execute a set of codes to control the functional elements of the device to perform the functions described below. Additionally or alternatively, the base station 105 may perform aspects of the functions described below using special-purpose hardware.

At block 1705, the base station 105 may identify one or more parameters of a transmission opportunity, where the one or more parameters include an upcoming special subframe, an upcoming uplink subframe, the start and the duration of an upcoming uplink burst, or the total length of a transmission opportunity as described above with reference to FIGS. 2 through 4. In certain examples, the operations of block 1705 may be performed by the TXOP component as described with reference to FIGS. 6 and 7.

At block 1710, the base station 105 may transmit the one or more parameters in a broadcast message or in a C-PDCCH as described above with reference to FIGS. 2 through 4. In certain examples, the operations of block 1710 may be performed by the TXOP component as described with reference to FIGS. 6 and 7.

Figure 18:
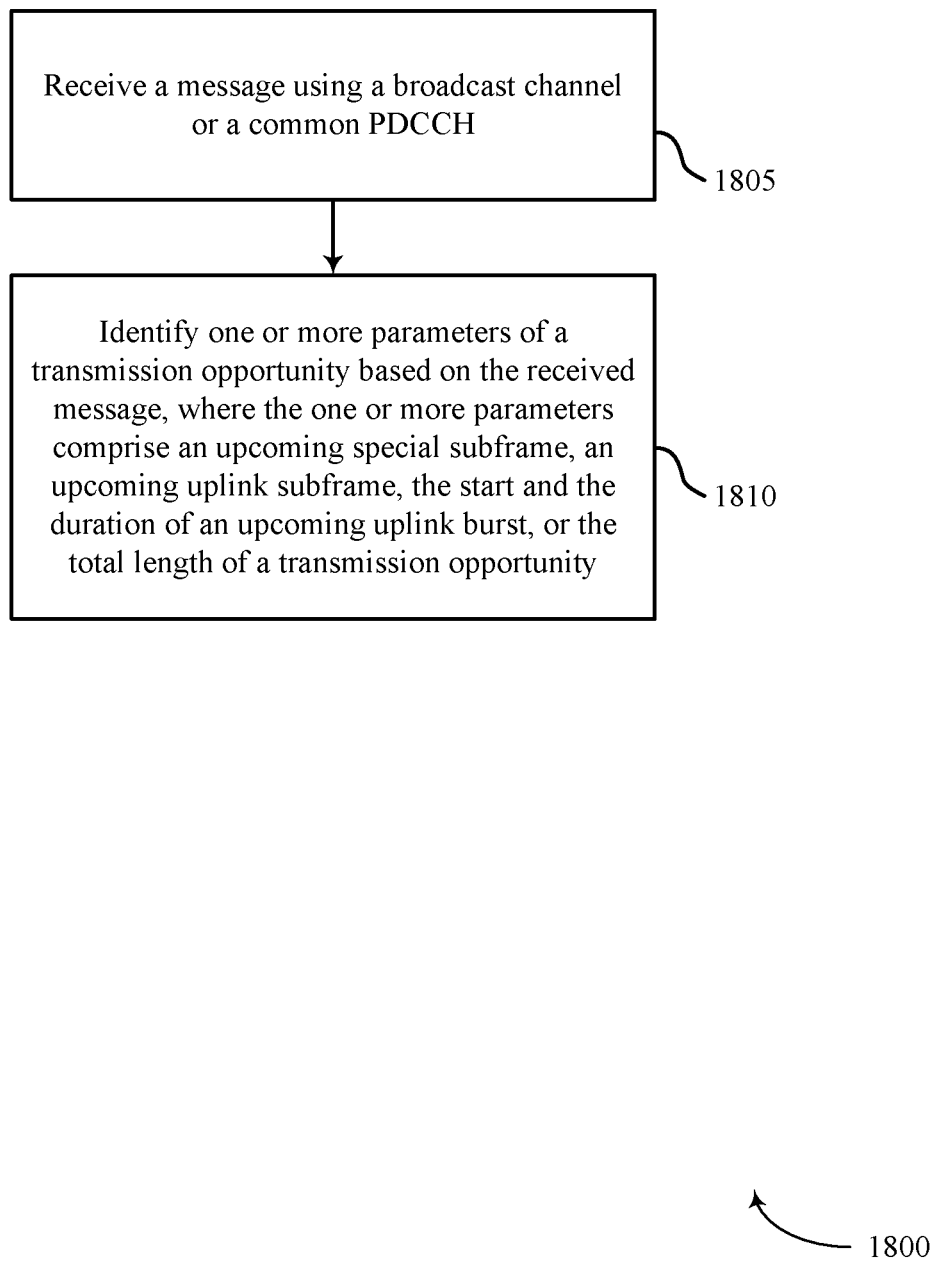

FIG. 18 shows a flowchart illustrating a method 1800 for DTXW detection and discovery signal measurement configuration in accordance with various aspects of the present disclosure. The operations of method 1800 may be implemented by a device such as a UE 115 or its components as described with reference to FIGS. 1, 2, 4A, 4B, and 9 through 12. For example, the operations of method 1800 may be performed by the UE DMTC manager as described herein. In some examples, the UE 115 may execute a set of codes to control the functional elements of the device to perform the functions described below. Additionally or alternatively, the UE 115 may perform aspects of the functions described below using special-purpose hardware.

At block 1805, the UE 115 may receive a message using a broadcast channel or a C-PDCCH as described above with reference to FIGS. 2 through 4. In certain examples, the operations of block 1805 may be performed by the TXOP component as described with reference to FIGS. 10 and 11.

At block 1810, the UE 115 may identify one or more parameters of a transmission opportunity based on the received message, where the one or more parameters include an upcoming special subframe, an upcoming uplink subframe, the start and the duration of an upcoming uplink burst, or the total length of a transmission opportunity as described above with reference to FIGS. 2 through 4. In certain examples, the operations of block 1810 may be performed by the TXOP component as described with reference to FIGS. 10 and 11.

It should be noted that these methods describe possible implementation, and that the operations and the steps may be rearranged or otherwise modified such that other implementations are possible. In some examples, aspects from two or more of the methods 1300, 1400, 1500, 1600, 1700, or 1800 described with reference to FIG. 13, 14, 15, 16, 17, or 18 may be combined. For example, aspects of each of the methods may include steps or aspects of the other methods, or other steps or techniques described herein. Thus, aspects of the disclosure may provide for DTXW detection and discovery signal measurement configuration.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an AP, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and wireless communications system 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for DTXW detection and discovery signal measurement configuration. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

What is claimed is:

1. A method for wireless communication, comprising: identifying a first subset of random access resources for a two-step random access procedure to access wireless resources of a shared radio frequency spectrum band; identifying a second subset of random access resources for a four-step random access procedure to access wireless resources of the shared radio frequency spectrum band; selecting one of the first subset of random access resources or the second subset of random access resources based at least in part on a channel metric of a communications channel of a base station; and transmitting a random access message using the selected subset of resources.

2. The method of claim 1, wherein: the selecting is based at least in part on a channel quality of the communications channel.

3. The method of claim 1, wherein: the selecting is based at least in part on one or more configured thresholds for selecting the first subset of random access resources or the second subset of random access resources.

4. The method of claim 1, wherein: the first subset of random access resources comprise a first subset of interlaces of a set of random access resources, and the second subset of random access resources comprise a second subset of interlaces of the set of random access resources.

5. A method for wireless communication, comprising: identifying a first subset of random access resources for a two-step random access procedure for use by a user equipment (UE) to access wireless resources of a shared radio frequency spectrum band; identifying a second subset of random access resources for a four-step random access procedure for use by the UE to access wireless resources of the shared radio frequency spectrum band; configuring one or more selection criteria for the UE to select one of the first subset of random access resources or the second subset of random access resources; and transmitting an indication of one or more of the first subset of random access resources, second subset of random access resources, or selection criteria, to the UE, wherein the one or more selection criteria includes a channel quality threshold of a communications channel associated with the UE.

6. The method of claim 5, wherein: the one or more selection criteria includes one or more configured thresholds for selecting the first subset of random access resources or the second subset of random access resources.

7. The method of claim 5, wherein: the first subset of random access resources comprise a first subset of interlaces of a set of random access resources, and the second subset of random access resources comprise a second subset of interlaces of the set of random access resources.

8. An apparatus for wireless communication, comprising: a processor; memory in electronic communication with the processor; and instructions stored in the memory and operable, when executed by the processor, to cause the apparatus to: identify a first subset of random access resources for a two-step random access procedure to access wireless resources of a shared radio frequency spectrum band; identify a second subset of random access resources for a four-step random access procedure to access wireless resources of the shared radio frequency spectrum band; select one of the first subset of random access resources or the second subset of random access resources based at least in part on a channel metric of a communications channel of a base station; and transmit a random access message using the selected subset of resources.

9. The apparatus of claim 8, wherein the instructions stored in the memory are operable, when executed by the processor, to cause the apparatus to: select one of the first subset of random access resources or the second subset of random access resources based at least in part on a channel quality of the communications channel.

10. The apparatus of claim 8, wherein the instructions stored in the memory are operable, when executed by the processor, to cause the apparatus to: select one of the first subset of random access resources or the second subset of random access resources based at least in part on one or more configured thresholds.

11. The apparatus of claim 8, wherein: the first subset of random access resources comprise a first subset of interlaces of a set of random access resources, and the second subset of random access resources comprise a second subset of interlaces of the set of random access resources.

12. An apparatus for wireless communication, comprising: a processor; memory in electronic communication with the processor; and instructions stored in the memory and operable, when executed by the processor, to cause the apparatus to: identify a first subset of random access resources for a two-step random access procedure for use by a user equipment (UE) to access wireless resources of a shared radio frequency spectrum band; identify a second subset of random access resources for a four-step random access procedure for use by the UE to access wireless resources of the shared radio frequency spectrum band; configure one or more selection criteria for the UE to select one of the first subset of random access resources or the second subset of random access resources; and transmit an indication of one or more of the first subset of random access resources, second subset of random access resources, or selection criteria, to the UE, wherein the one or more selection criteria includes a channel quality threshold of a communications channel associated with the UE.

13. The apparatus of claim 12, wherein: the one or more selection criteria includes one or more configured thresholds for selecting the first subset of random access resources or the second subset of random access resources.

14. The apparatus of claim 12, wherein: the first subset of random access resources comprise a first subset of interlaces of a set of random access resources, and the second subset of random access resources comprise a second subset of interlaces of the set of random access resources.

15. A non-transitory computer readable medium storing code for wireless communication, the code comprising instructions executable to: identify a first subset of random access resources for a two-step random access procedure to access wireless resources of a shared radio frequency spectrum band; identify second subset of random access resources for a four-step random access procedure to access wireless resources of the shared radio frequency spectrum band; select one of the first subset of random access resources or the second subset of random access resources based at least in part on a channel metric of a communications channel of a base station; and transmit a random access message using the selected subset of resources.

16. The non-transitory computer-readable medium of claim 15, wherein the instructions are executable to: select one of the first subset of random access resources or the second subset of random access resources based at least in part on a channel quality of the communications channel.

17. The non-transitory computer-readable medium of claim 15, wherein the instructions are executable to: select one of the first subset of random access resources or the second subset of random access resources based at least in part on one or more configured thresholds for selecting the first subset of random access resources or the second subset of random access resources.

18. The non-transitory computer-readable medium of claim 15, wherein: the first subset of random access resources comprise a first subset of interlaces of a set of random access resources, and the second subset of random access resources comprise a second subset of interlaces of the set of random access resources.

19. A non-transitory computer readable medium storing code for wireless communication, the code comprising instructions executable to: identify a first subset of random access resources for a two-step random access procedure for use by a user equipment (UE) to access wireless resources of a shared radio frequency spectrum band; identify a second subset of random access resources for a four-step random access procedure for use by the UE to access wireless resources of the shared radio frequency spectrum band; configure one or more selection criteria for the UE to select one of the first subset of random access resources or the second subset of random access resources; and transmit an indication of one or more of the first subset of random access resources, second subset of random access resources, or selection criteria, to the UE, wherein the one or more selection criteria includes a channel quality threshold of a communications channel associated with the UE.

20. The non-transitory computer-readable medium of claim 19, wherein: the one or more selection criteria includes one or more configured thresholds for selecting the first subset of random access resources or the second subset of random access resources.

21. The non-transitory computer-readable medium of claim 19, wherein: the first subset of random access resources comprise a first subset of interlaces of a set of random access resources, and the second subset of random access resources comprise a second subset of interlaces of the set of random access resources.

22. An apparatus for wireless communication, comprising: means for identifying a first subset of random access resources for a two-step random access procedure to access wireless resources of a shared radio frequency spectrum band; means for identifying second subset of random access resources for a four-step random access procedure to access wireless resources of the shared radio frequency spectrum band; means for selecting one of the first subset of random access resources or the second subset of random access resources based at least in part on a channel metric of a communications channel of a base station; and means for transmitting a random access message using the selected subset of resources.

23. The apparatus of claim 22, wherein: the means for selecting is operable based at least in part on a channel quality of the communications channel.

24. The apparatus of claim 22, wherein: the means for selecting is operable based at least in part on one or more configured thresholds for selecting the first subset of random access resources or the second subset of random access resources.

25. An apparatus for wireless communication, comprising: means for identifying a first subset of random access resources for a two-step random access procedure for use by a user equipment (UE) to access wireless resources of a shared radio frequency spectrum band; means for identifying second subset of random access resources for a four-step random access procedure for use by the UE to access wireless resources of the shared radio frequency spectrum band; means for configuring one or more selection criteria for the UE to select one of the first subset of random access resources or the second subset of random access resources; and means for transmitting an indication of one or more of the first subset of random access resources, second subset of random access resources, or selection criteria, to the UE, wherein the one or more selection criteria includes a channel quality threshold of a communications channel associated with the UE.

26. The apparatus of claim 25, wherein: the one or more selection criteria includes one or more configured thresholds for selecting the first subset of random access resources or the second subset of random access resources.

\* \* \* \* \*